United States Patent
Kanno

(10) Patent No.: US 12,481,462 B2
(45) Date of Patent: *Nov. 25, 2025

(54) MEMORY SYSTEM AND METHOD OF CONTROLLING NONVOLATILE MEMORY WITH CHECKING A TOTAL SIZE INDICATIVE OF A SUM OF DATA LENGTH SPECIFIED BY A WRITE COMMAND

(71) Applicant: KIOXIA CORPORATION, Tokyo (JP)

(72) Inventor: Shinichi Kanno, Ota (JP)

(73) Assignee: KIOXIA CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/645,482

(22) Filed: Apr. 25, 2024

(65) Prior Publication Data
US 2024/0295991 A1    Sep. 5, 2024

Related U.S. Application Data

(63) Continuation of application No. 18/298,141, filed on Apr. 10, 2023, now Pat. No. 12,045,513, which is a continuation of application No. 17/484,365, filed on Sep. 24, 2021, now Pat. No. 11,650,760, which is a continuation of application No. 16/815,926, filed on Mar. 11, 2020, now Pat. No. 11,163,493.

(30) Foreign Application Priority Data

Aug. 28, 2019    (JP) .................................. 2019-155810

(51) Int. Cl.
G06F 3/06          (2006.01)

(52) U.S. Cl.
CPC .......... *G06F 3/0659* (2013.01); *G06F 3/0604* (2013.01); *G06F 3/064* (2013.01); *G06F 3/0656* (2013.01); *G06F 3/0679* (2013.01)

(58) Field of Classification Search
CPC ...... G06F 3/0604; G06F 3/064; G06F 3/0656; G06F 3/0659; G06F 3/0679
See application file for complete search history.

(56) References Cited

U.S. PATENT DOCUMENTS

| | | | |
|---|---|---|---|
| 9,268,706 | B2 | 2/2016 | Kunimatsu et al. |
| 2011/0276746 | A1 | 11/2011 | Pruthi |
| 2012/0084484 | A1 | 4/2012 | Post |
| 2015/0095554 | A1 | 4/2015 | Asnaashari |

(Continued)

FOREIGN PATENT DOCUMENTS

JP        5762930 B2    8/2015

*Primary Examiner* — Larry T Mackall
(74) *Attorney, Agent, or Firm* — Oblon, McClelland, Maier & Neustadt, L.L.P.

(57) ABSTRACT

According to one embodiment, a memory system checks a first total size indicative of a sum of data lengths specified by first write commands stored in a first submission queue of a host corresponding to a first stream. When the first total size is greater than or equal to a minimum write size, the memory system fetches a set of first write commands stored in the first submission queue, transfers first write data associated with the set of first write commands from a memory of the host to the memory system, and writes the first write data into a first write destination block allocated for the first stream.

20 Claims, 15 Drawing Sheets

(56) References Cited

U.S. PATENT DOCUMENTS

| | | |
|---|---|---|
| 2015/0186068 A1* | 7/2015 | Benisty .............. G06F 3/0673 |
| | | 711/154 |
| 2015/0319237 A1 | 11/2015 | Hussain |
| 2016/0147671 A1 | 5/2016 | Vishne |
| 2016/0283116 A1 | 9/2016 | Ramalingam |
| 2017/0286205 A1 | 10/2017 | Jeong et al. |
| 2018/0203605 A1 | 7/2018 | Tseng |
| 2018/0217951 A1 | 8/2018 | Benisty |
| 2018/0275872 A1 | 9/2018 | Benisty et al. |
| 2018/0285073 A1 | 10/2018 | Fukuchi |
| 2021/0064542 A1 | 3/2021 | Jang |

\* cited by examiner

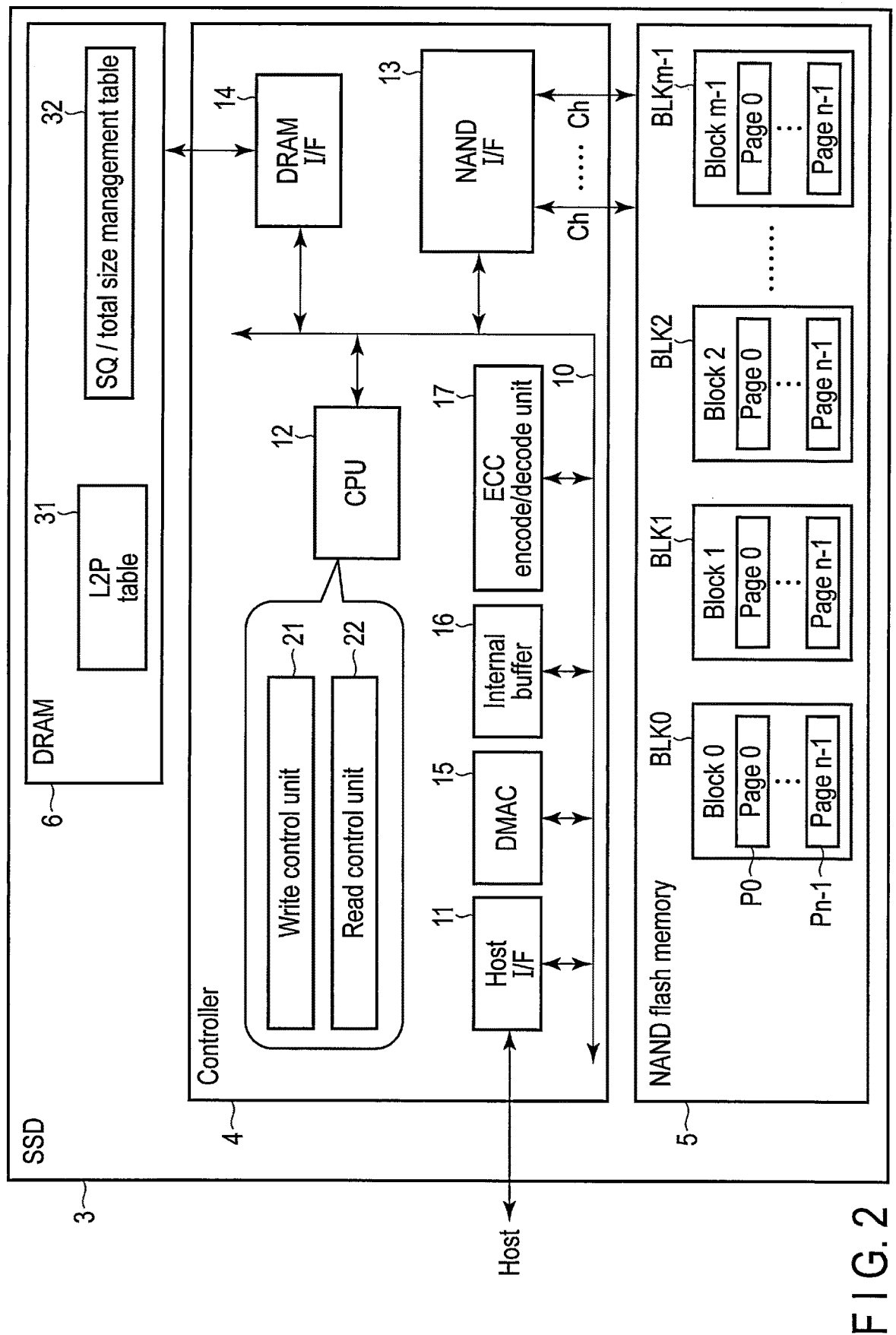
F I G. 2

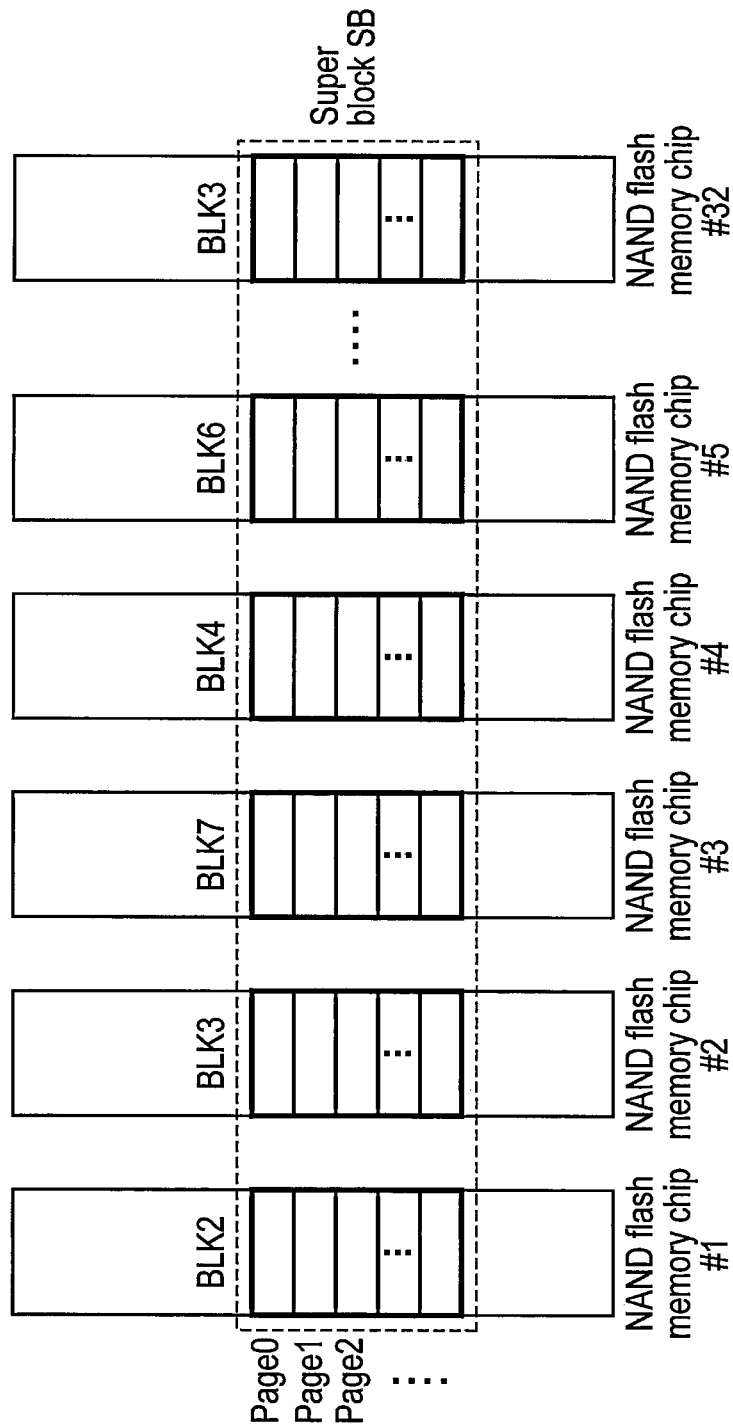
F I G. 4

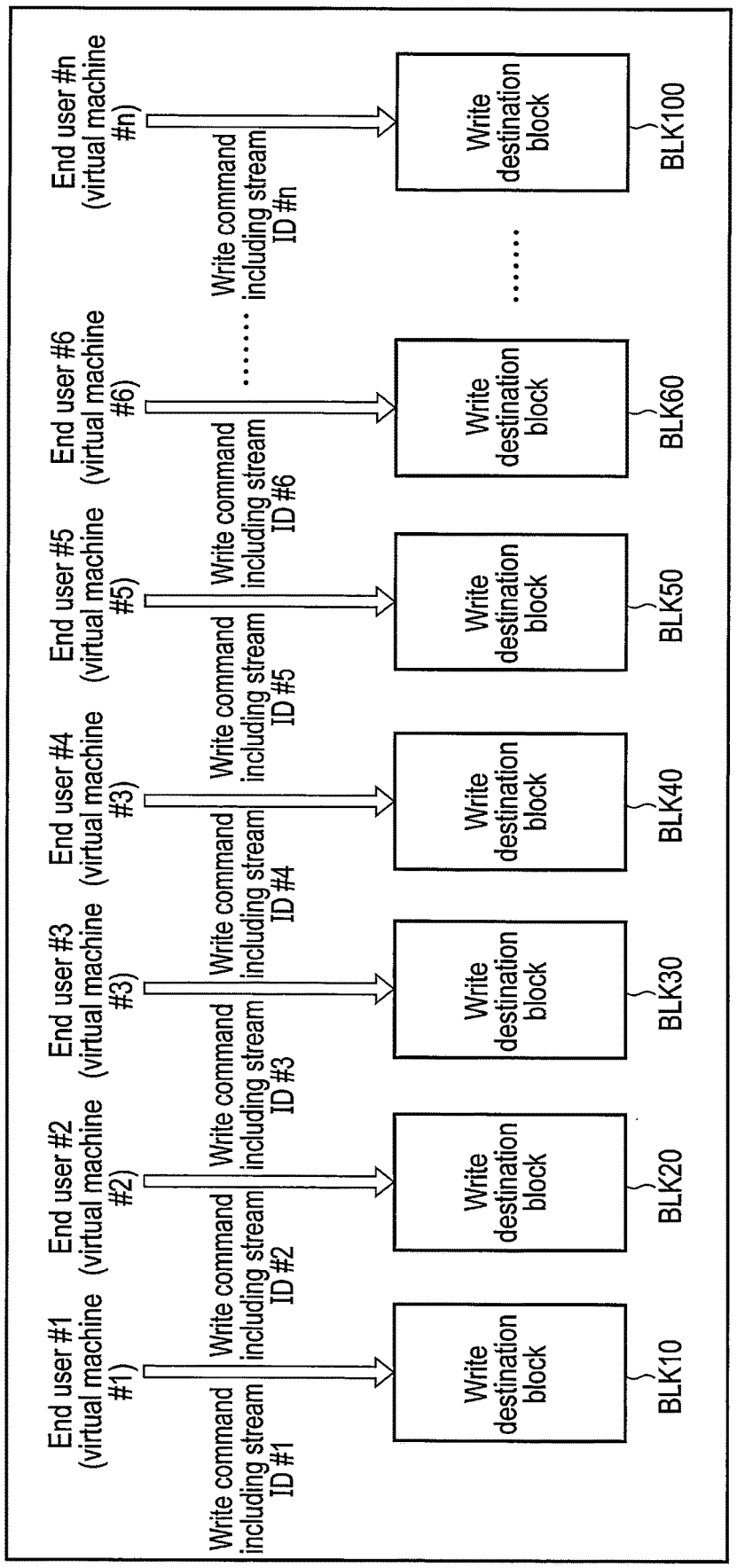
F I G. 5

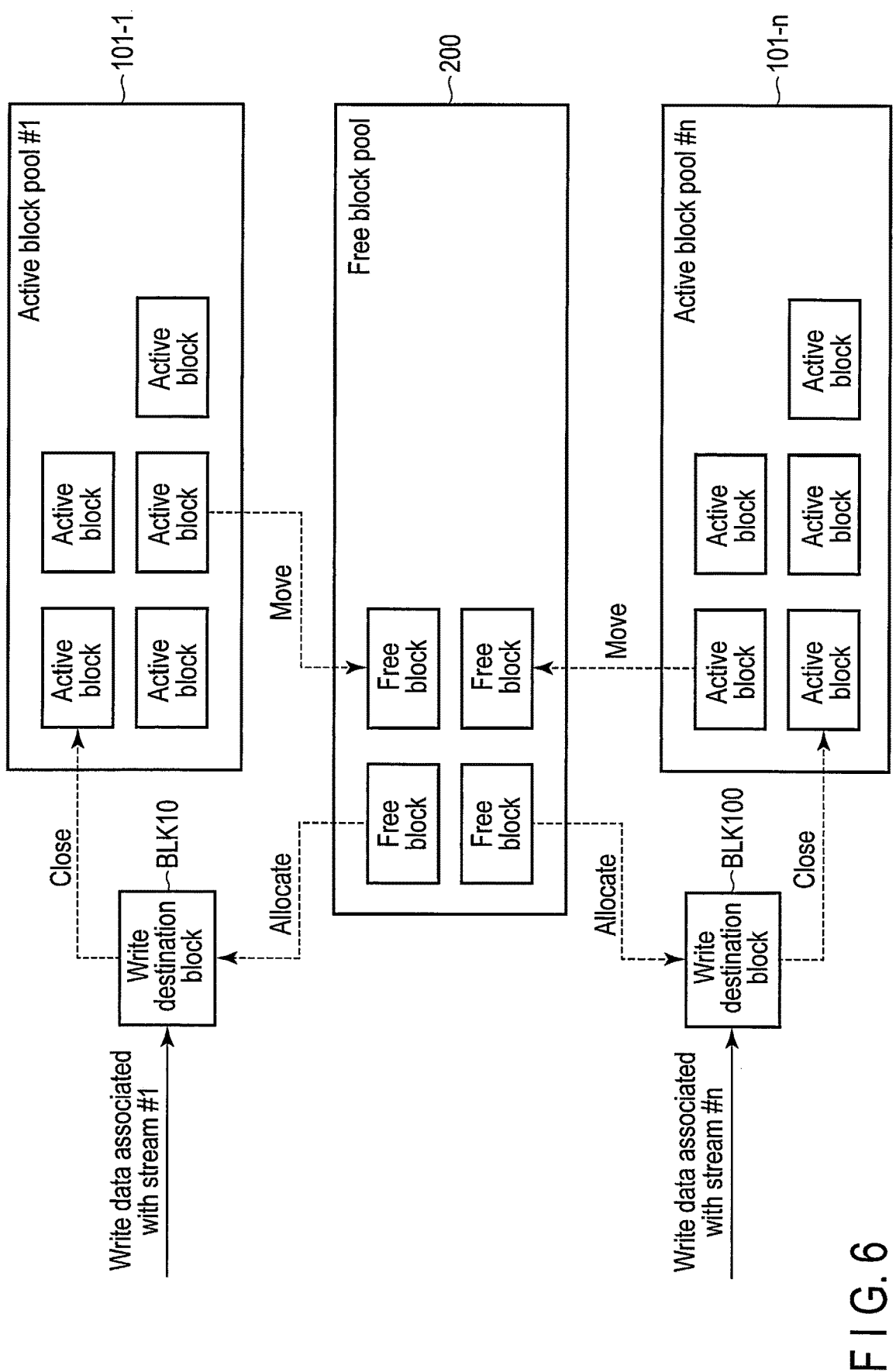
F I G. 6

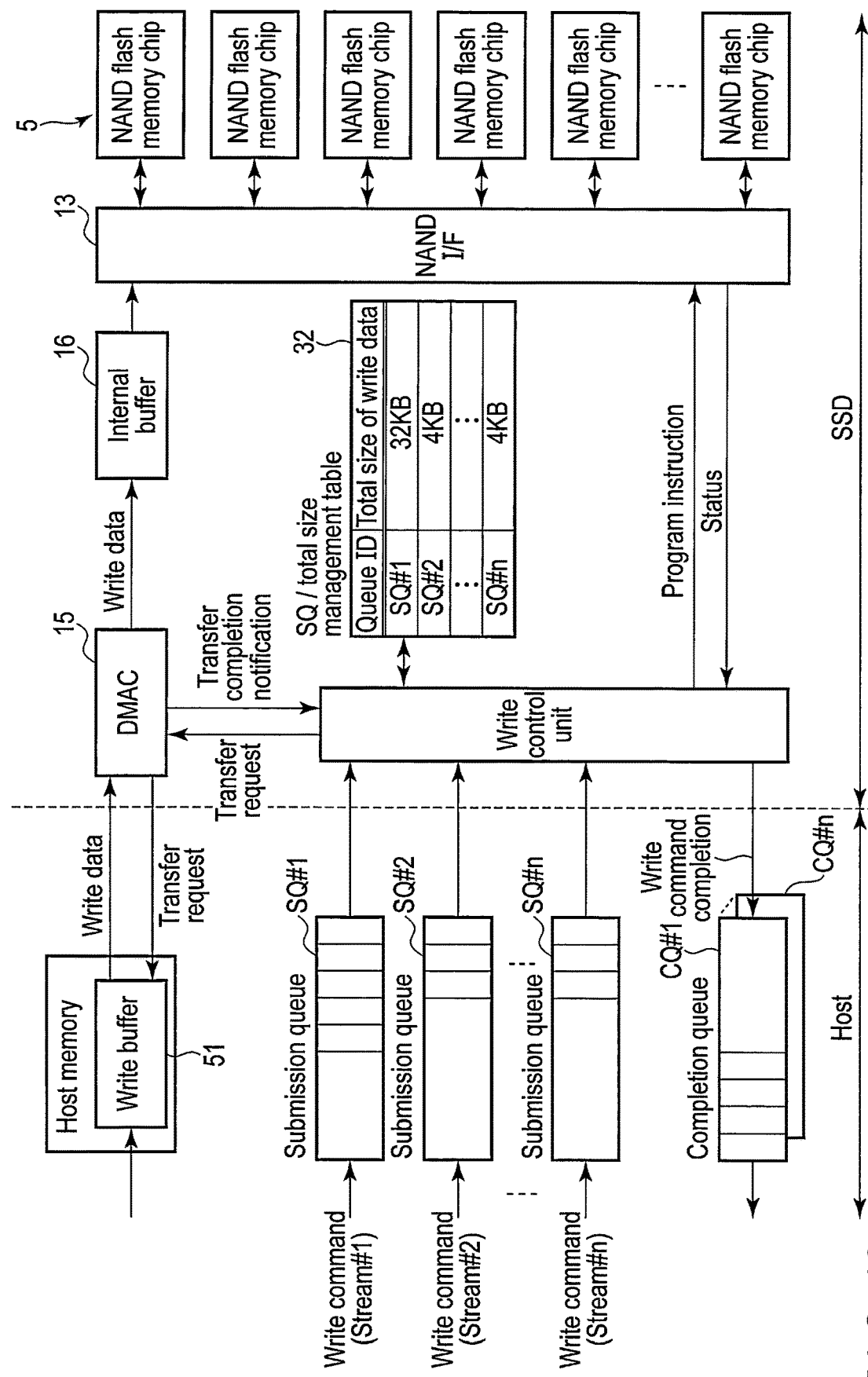
F I G. 12

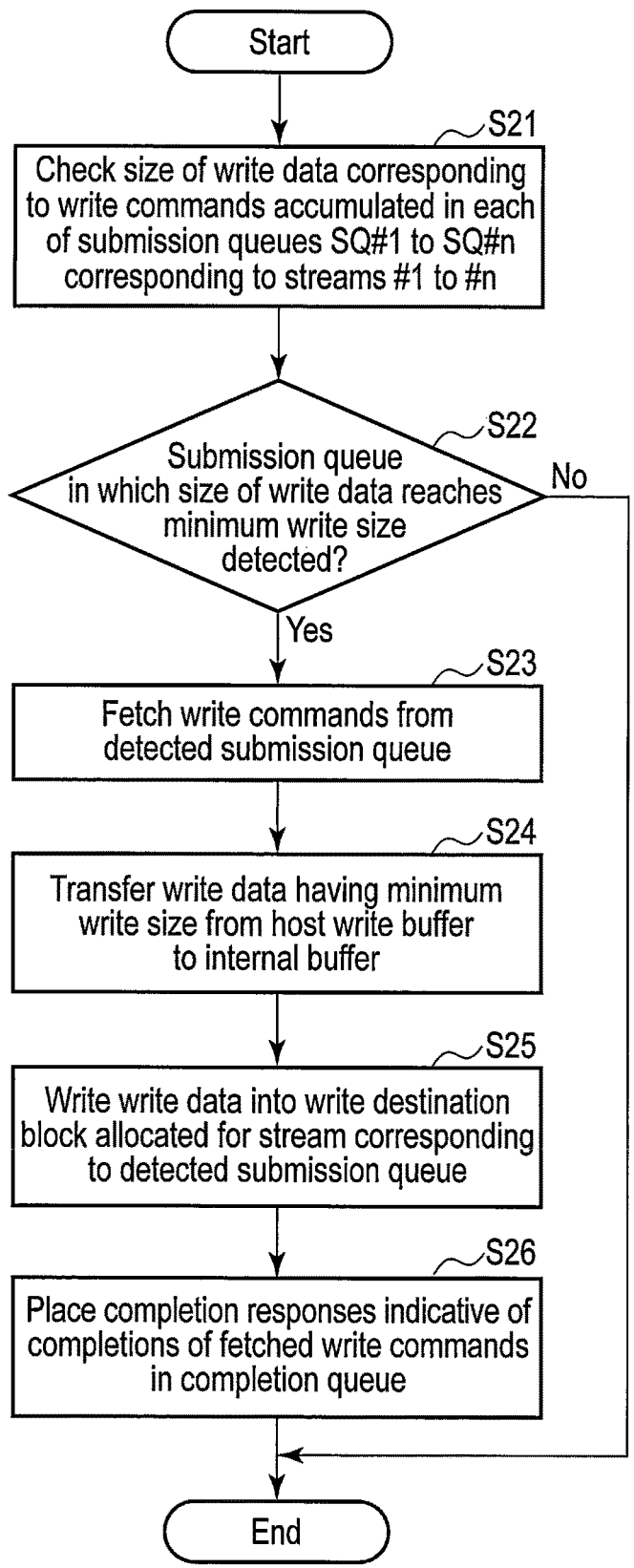
F I G. 14

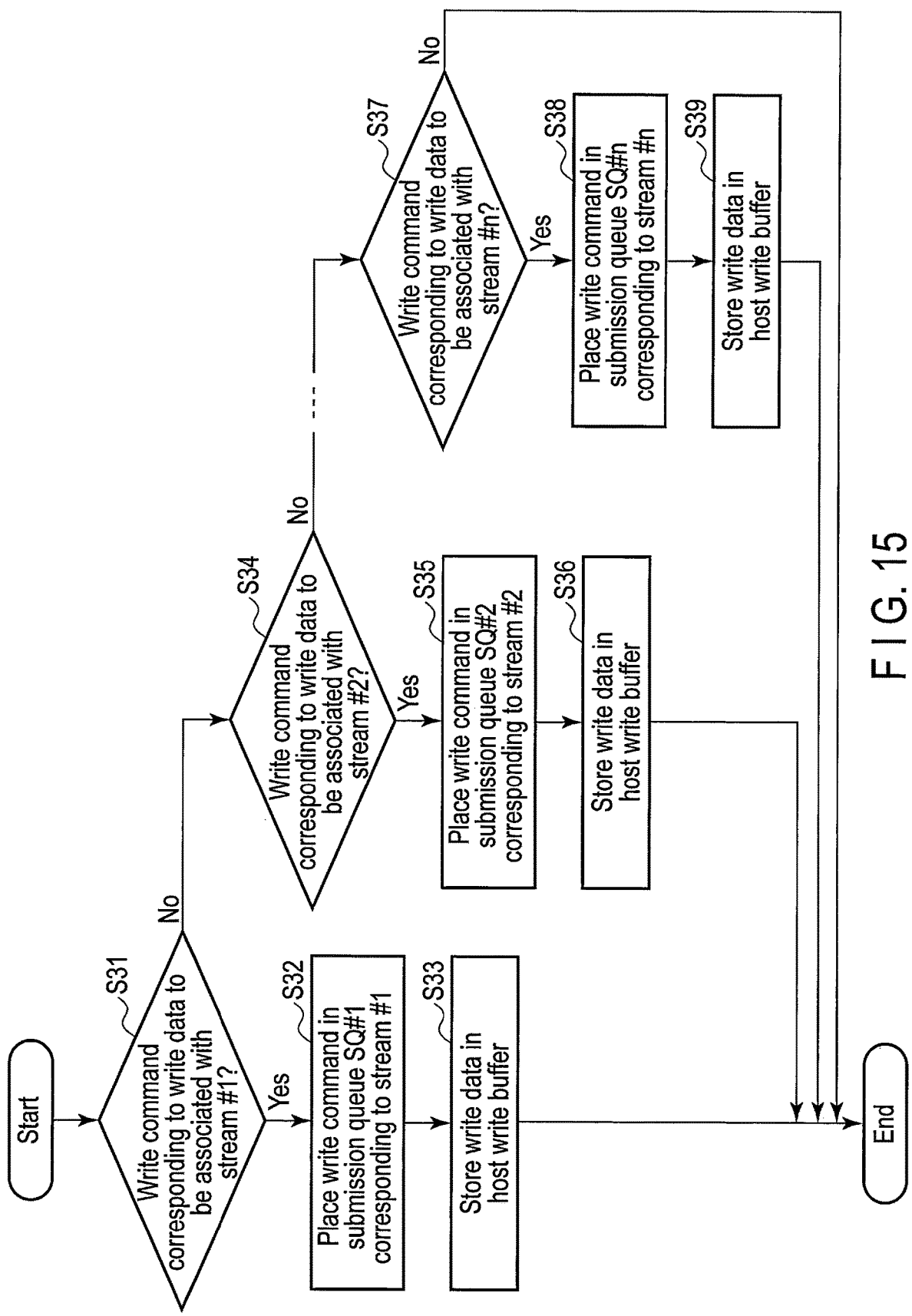
F I G. 15

MEMORY SYSTEM AND METHOD OF CONTROLLING NONVOLATILE MEMORY WITH CHECKING A TOTAL SIZE INDICATIVE OF A SUM OF DATA LENGTH SPECIFIED BY A WRITE COMMAND

CROSS-REFERENCE TO RELATED APPLICATIONS

This application is a continuation of and claims benefit under 35 U.S.C. § 120 to U.S. application Ser. No. 18/298,141, filed Apr. 10, 2023, which is a continuation of and claims benefit under 35 U.S.C. § 120 to U.S. application Ser. No. 17/484,365, filed Sep. 24, 2021 (now U.S. Pat. No. 11,650,760), which is a continuation of and claims benefit under 35 U.S.C. § 120 to U.S. application Ser. No. 16/815,926, filed Mar. 11, 2020 (now U.S. Pat. No. 11,163,493), which is based upon and claims the benefit of priority under 35 U.S.C. § 119 from Japanese Patent Application 2019-155810, filed Aug. 28, 2019, the entire contents of each of which are incorporated herein by reference.

FIELD

Embodiments described herein relate generally to a technique for controlling a nonvolatile memory.

BACKGROUND

In recent years, memory systems comprising nonvolatile memories have become widespread. As one of the memory systems, a solid-state drive (SSD) based on NAND flash technology has been known.

The SSD has been used as a storage device for various host computing systems such as the server of a data center.

A storage device used in a host computing system may be required to write different types of data into different write destination blocks.

BRIEF DESCRIPTION OF THE DRAWINGS

FIG. 2 is a block diagram illustrating a configuration example of the memory system according to the embodiment.

FIG. 4 is a diagram illustrating a configuration example of a super block used in the memory system according to the embodiment.

FIG. 5 is a block diagram illustrating a stream write operation which writes a plurality of types of write data associated with a plurality of streams into a plurality of write destination blocks corresponding to the streams, respectively.

FIG. 6 is a block diagram illustrating an operation for allocating a plurality of write destination blocks correspond to a plurality of streams from a group of free blocks.

FIG. 12 is a block diagram illustrating the configuration examples of the host and the memory system according to the embodiment with regard to data write.

FIG. 14 is a flowchart illustrating a procedure of a write process performed in the memory system according to the embodiment.

FIG. 15 is a flowchart illustrating a procedure of a process performed in the host.

DETAILED DESCRIPTION

Various embodiments will be described hereinafter with reference to the accompanying drawings.

In general, according to one embodiment, a memory system connectable to a host comprises a nonvolatile memory including a plurality of blocks, and a controller electrically connected to the nonvolatile memory and configured to control the nonvolatile memory.

The controller is configured check a first total size indicative of a sum of data lengths specified by first write commands and a second total size indicative of a sum of data lengths specified by second write commands, the first write commands being associated with a first stream and stored in a first submission queue of the host corresponding to the first stream, and the second write commands being associated with a second stream and stored in a second submission queue of the host corresponding to the second stream.

When the first total size is greater than or equal to a minimum write size of the nonvolatile memory, the controller fetches a set of first write commands stored in the first submission queue, transfers first write data having the minimum write size and associated with the set of first write commands from a write buffer in a memory of the host to a first buffer in the memory system, and writes the first write data into a first write destination block which is allocated for the first stream from the blocks.

When the second total size is greater than or equal to the minimum write size, the controller fetches a set of second write commands stored in the second submission queue, transfers second write data having the minimum write size and associated with the set of second write commands from the write buffer to the first buffer, and writes the second write data into a second write destination block which is allocated for the second stream from the blocks.

Figure 1:
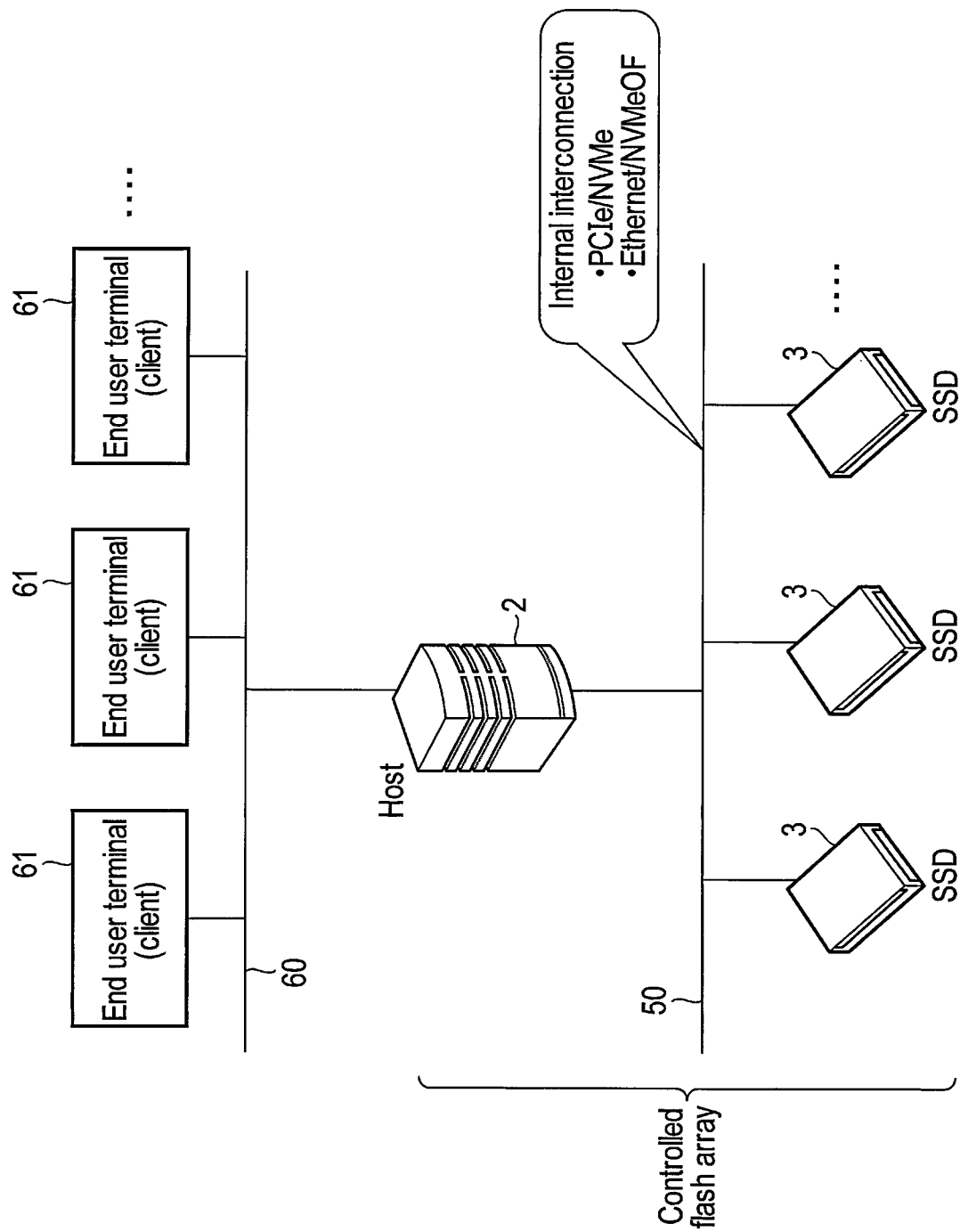
FIG. 1 is a block diagram illustrating the relationship between a host and a memory system according to an embodiment.

FIG. 1 is a block diagram illustrating the relationship between a host and a memory system according to an embodiment.

The memory system is a semiconductor storage device configured to write data into a nonvolatile memory and read data from the nonvolatile memory. The memory system is realized as a solid-state drive (SSD) 3 based on NAND flash technology.

The host (host device) 2 is configured to control a plurality of SSDs 3. The host 2 is realized by an information processing apparatus configured to use a flash array including the plurality of SSDs 3 as storage. The information processing apparatus may be a personal computer or a server computer.

Each SSD 3 may be utilized as one of a plurality of storage devices provided in a storage array. The storage array may be connected to an information processing apparatus such as a server computer via a cable or a network. The storage array includes a controller which controls the storage devices (for example, the SSDs 3) in the storage array. When the SSDs 3 are applied to the storage array, the controller of the storage array may function as the host of the SSDs 3.

Hereinafter, this specification exemplarily explains a case where an information processing device such as a server computer functions as the host 2.

The host (server) 2 and a plurality of SSDs 3 are interconnected (internally interconnected) via an interface 50. As the interface 50 for interconnection, for example, a PCI Express (PCIe) (registered trademark), NVM Express (NVMe) (registered trademark), Ethernet (registered trademark) or NVMe over Fabrics (NVMeOF) may be used. However, it should be noted that the interface 50 is not limited to these examples.

A typical example of the server computer which functions as the host 2 is a server computer (hereinafter, referred to as a server) in a data center.

In a case where the host 2 is realized by a server in a data center, the host (server) 2 may be connected to a plurality of end user terminals (clients) 61 via a network 60. The host 2 is capable of providing the end user terminals 61 with various services.

Examples of the services provided by the host (server) 2 include, for example, (1) a Platform as a Service (PaaS), which provides each client (end user terminal 61) with a system running platform, and (2) an Infrastructure as a Service (IaaS), which provides each client (end user terminal 61) with an infrastructure such as a virtual server.

A plurality of virtual machines may be run on the physical server which functions as the host (server) 2. Each of the virtual machines running on the host (server) 2 is capable of functioning as a virtual server configured to provide a client (end user terminal 61) corresponding to the virtual machine with various services. In each virtual machine, an operating system and a user application used by a corresponding end user 61 are executed. An operating system corresponding to each virtual machine includes an I/O service. The I/O service may be a logical block address (LBA)-based block I/O service or a key-value store service.

In an operating system corresponding to each virtual machine, the I/O service issues an I/O command (write command or read command) in response to a write/read request from the user application. The I/O command is placed into a submission queue in the host 2 and transmitted to the SSD 3 via the submission queue.

Each SSD 3 includes a nonvolatile memory such as a NAND flash memory. The SSD 3 supports stream write for writing a plurality of types of write data associated with different streams into different blocks, respectively. The SSD 3 allocates a plurality of write destination blocks corresponding to a plurality of streams, from a plurality of blocks in the nonvolatile memory. The write destination blocks refer to the blocks into which data should be written.

Each write command transmitted from the host 2 to the SSDs 3 includes a stream identifier (stream ID) indicative of one of a plurality of streams. When an SSD 3 receives a write command including the stream ID of a stream from the host 2, the SSD 3 writes write data associated with the write command into a write destination block corresponding to the stream. When the SSD 3 receives a write command including the stream ID of another stream from the host 2, the SSD 3 writes write data associated with the write command into another write destination block corresponding to the other stream. When a write destination block corresponding to a certain stream is fully filled with data, a new write destination block for the stream is allocated.

Thus, the host 2 is capable of realizing, for example, data placement for writing a group of a specific type of data such as the data of a user application corresponding to an end user terminal 61 (client) into one or more specific blocks and writing a group of another specific type of data such as the data of a user application corresponding to another end user terminal 61 (client) into another or other blocks by issuing write commands each including a stream ID to the SSDs 3.

FIG. 2 illustrates a configuration example of the SSD 3.

The SSD 3 comprises a controller 4 and a nonvolatile memory (NAND flash memory) 5. The SSD 3 may comprise a random access memory such as a DRAM 6.

The NAND flash memory 5 includes a memory cell array including a plurality of memory cells arrayed in matrix. The NAND flash memory 5 may be either a NAND flash memory comprising a two-dimensional structure or a NAND flash memory comprising a three-dimensional structure.

The memory cell array of the NAND flash memory 5 includes a plurality of blocks BLK0 to BLKm−1. Each of blocks BLK0 to BLKm−1 includes a plurality of pages (here, pages P0 to Pn−1). Blocks BLK0 to BLKm−1 function as erase units. The blocks may be called erase blocks, physical blocks or physical erase blocks. Pages P0 to Pn−1 are the units of data write operation and data read operation.

The controller 4 is electrically connected to the NAND flash memory 5 which is a nonvolatile memory via a NAND interface 13 such as a Toggle NAND flash interface or an open NAND flash interface (ONFI). The controller 4 operates as a memory controller configured to control the NAND flash memory 5. The controller 4 may be realized by a circuit such as a System-on-a-chip (SoC).

Figure 3:
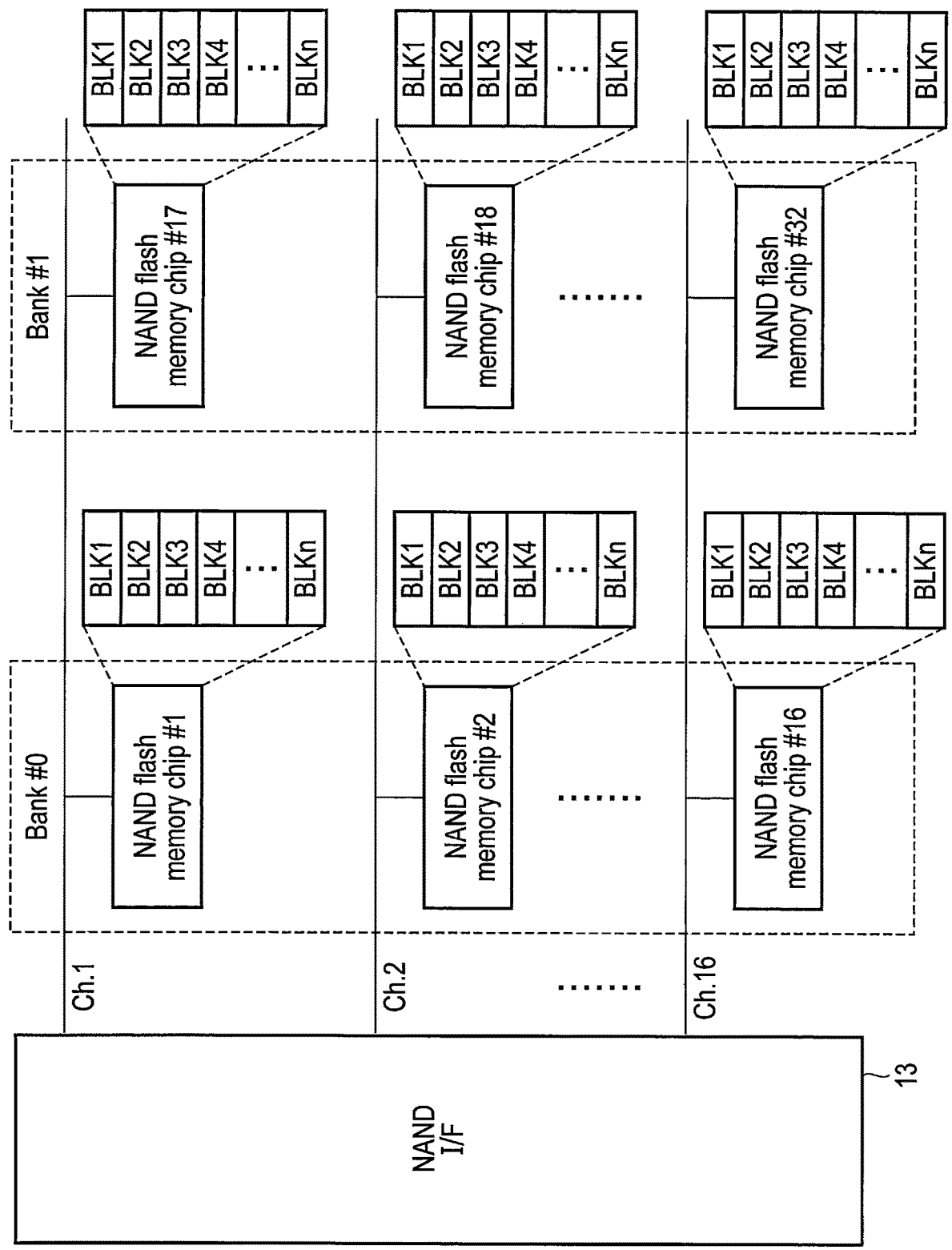
FIG. 3 is a block diagram illustrating the relationship between a plurality of channels and a plurality of NAND flash memory chips used in the memory system according to the embodiment.

As shown in FIG. 3, the NAND flash memory 5 may include a plurality of NAND flash memory chips (NAND flash memory dies). Each NAND flash memory chip is independently operable. Thus, the NAND flash memory chips function as parallel operable units. FIG. 3 illustrates a case where 16 channels Ch. 1 to Ch. 16 are connected to the NAND interface 13, and two NAND flash memory chips are connected to each of 16 channels Ch. 1 to Ch. 16. In this case, 16 NAND flash memory chips #1 to #16 connected to channels Ch. 1 to Ch. 16 may be organized as bank #0. The remaining 16 NAND flash memory chips #17 to #32 connected to channels Ch. 1 to Ch. 16 may be organized as bank #1. The banks function as the units of causing a plurality of memory modules to operate in parallel by bank interleaving. In the configuration example of FIG. 3, the parallel operation of up to 32 NAND flash memory chips is realized by 16 channels and bank interleaving with two banks.

Erase operation may be performed in units of block (physical block) or in units of parallel unit (super block) including a set of physical blocks which are operable in parallel. Each parallel unit, in other words, each superblock including a set of physical blocks, may include 32 physical blocks in total selected from NAND flash memory chips #1 to #32 one by one although the configuration is not limited to this example. Each of NAND flash memory chips #1 to #32 may comprise a multi-plane structure. For example, when each of NAND flash memory chips #1 to #32 comprises a multi-plane structure including two planes, each super block may include 64 physical blocks in total selected one by one from 64 planes corresponding to NAND flash memory chips #1 to #32.

FIG. 4 illustrates a single super block SB including 32 physical blocks (here, physical block BLK2 in NAND flash memory chip #1, physical block BLK3 in NAND flash memory chip #2, physical block BLK7 in NAND flash memory chip #3, physical block BLK4 in NAND flash memory chip #4, physical block BLK6 in NAND flash memory chip #5, . . . , physical block BLK3 in NAND flash memory chip #32).

The write destination block may be either a single physical block or a single super block. Each superblock may include only one physical block. In this case, a single super block is equivalent to a single physical block.

Now, this specification explains the configuration of the controller 4 of FIG. 2.

The controller 4 may function as a flash translation layer (FTL) configured to perform the data management and the block management of the NAND flash memory 5. The data management performed by the FTL includes, for example, (1) the management of mapping information indicative of the correspondence relationships between logical addresses and the physical addresses of the NAND flash memory 5, and (2) a process for hiding the restriction of the NAND flash memory 5 (for example, read/write operation in page units and erase operation in block units). The logical addresses are the addresses used by the host 2 to specify the addresses of the locations in the logical address space of the SSD 3. As the logical addresses, logical block addresses (addressing) (LBAs) may be used.

The management of mapping between the local addresses used by the host 2 to access the SSD 3 and the physical addresses of the NAND flash memory 5 is performed by using an address translation table (logical-to-physical address translation table: L2P table) 31. The controller 4 manages mapping between logical addresses and physical addresses in predetermined management size units, using the L2P table 31. A physical address corresponding to a logical address is indicative of the latest physical storage location in which data corresponding to the logical address is written in the NAND flash memory 5. The L2P table 31 may be loaded from the NAND flash memory 5 into the DRAM 6 when the SSD 3 is powered on.

In the NAND flash memory 5, data can be written into a page only once per erase cycle. In other words, a region in a block in which data has been already written cannot be directly overwritten with new data. For this reason, when data which has been already written is updated, the controller 4 writes new data into a region in which no data is written in the block (or another block), and deals with previous data as invalid data. In other words, the controller 4 writes updated data corresponding to a logical address into a physical storage location different from the physical storage location in which previous data corresponding to the logical address is stored. The controller 4 updates the L2P table 31, associates the logical address with the physical storage location in which the updated data is written, and invalidates the previous data. In the present embodiment, the L2P table 31 may be updated after the data to be written (write data) is written into the NAND flash memory 5, or after write data is transferred from the host 2, or after a write command is received from the host 2.

The block management includes, for example, the management of defective blocks, wear leveling and garbage collection (GC). Wear leveling is the operation for leveling the number of rewrites (the number of program/erase cycles) of blocks.

GC is the operation for increasing the number of free blocks. The free blocks are indicative of blocks which do not contain valid data. In GC, the controller 4 copies the valid data of some blocks which contain both valid data and invalid data to another block (for example, free block). Here, valid data is indicative of data associated with a logical address. For example, data referred to from the L2P table 31 (in other words, data associated as the latest data from a logical address) is valid data, and may be read from the host 2. Invalid data is indicative of data which is not associated with any logical address. Data which is not associated with any logical address is data which no longer has a possibility that the data is read from the host 2. The controller 4 updates the L2P table 31 and maps the logical addresses of the copied valid data to the copy destination physical addresses, respectively. Each block containing only invalid data as valid data has been copied to another block is released as a free block. In this way, these blocks become available again after erase operation is applied to the blocks.

The controller 4 includes a host interface 11, a CPU 12, the NAND interface 13, a DRAM interface 14, a direct memory access controller (DMAC) 15, an internal buffer 16, an ECC encode/decode unit 17, etc. The host interface 11, the CPU 12, the NAND interface 13, the DRAM interface 14, the DMAC 15, the internal buffer 16 and the ECC encode/decode unit 17 are interconnected via a bus 10.

The host interface 11 is a host interface circuit configured to perform communication with the host 2. The host interface 11 may be, for example, a PCIe controller (NVMe controller). When the SSD 3 is connected to the host 2 via Ethernet (registered trademark), the host interface 11 may be an NVMe over Fabrics (NVMeOF) controller.

The host interface 11 receives various commands from the host 2. These commands include a write command, a read command, a deallocation (unmap/trim) command and other various commands.

A write command is a command (write request) for writing the data to be written (write data) into the NAND flash memory 5, and includes the logical address (starting LBA) of the write data, the length of the write data, a stream identifier (stream ID) indicative of the stream associated with the write data, a data pointer (buffer address) indicative of the location in the write buffer in the memory of the host 2 in which the write data is stored, etc.

A read command is a command (read request) for reading data from the NAND flash memory 5, and includes the logical address (starting LBA) of the data to be read, the length of the data, a data pointer (buffer address) indicative of the location in the read buffer in the memory of the host 2 to which the data should be transferred.

A deallocation (unmap/trim) command is a command for invalidating data corresponding to a logical address. A deallocation (unmap/trim) command specifies the logical address range (LBA range) to be invalidated.

The CPU 12 is a processor configured to control the host interface 11, the NAND interface 13 and the DRAM interface 14. The CPU 12 performs various processes by loading a control program (firmware) into the DRAM 6 from the NAND flash memory 5 or a ROM (not shown) when the SSD 3 is powered on, and executing the firmware. The firmware may be loaded into an SRAM (not shown) provided in the controller 4. The CPU 12 is capable of performing a command process for executing various commands from the host 2, etc. The operation of the CPU 12 is controlled by the above firmware. A command process may be partially or entirely performed by dedicated hardware in the controller 4.

The CPU 12 is capable of functioning as a write control unit 21 and a read control unit 22. Each of the write control unit 21 and the read control unit 22 may be partially or entirely realized by dedicated hardware in the controller 4.

In accordance with a write command received from the host 2, the write control unit 21 performs a process for writing write data associated with the write command into the NAND flash memory 5. The write control unit 21 supports the above stream write operation. The write control unit 21 allocates a plurality of write destination blocks corresponding to a plurality of streams from a plurality of blocks of the NAND flash memory 5, and manages the allocated write destination blocks.

In some NAND flash memories, to reduce program disturbance, data written in one of the pages in a block becomes readable after data is written into one or more subsequent pages. The time point at which the data of each page becomes readable differs depending on the writing method applied to the NAND flash memory.

For example, in a triple-level cell (TLC) flash memory, which can store 3 bits of data per memory cell, a lower page, a middle page and an upper page are allocated to the memory cells connected to word line WL0, and a lower page, a middle page and an upper page are allocated to the memory cells connected to the next word line WL1, and a lower page, a middle page and an upper page are allocated to the memory cells connected to the next word line WL2, and a lower page, a middle page and an upper page are allocated to the memory cells connected to the next word line WL3, and a lower page, a middle page and an upper page are allocated to the memory cells connected to the last word line WLn. In the memory cells connected to each word line, data cannot be correctly read from each of the lower and middle pages until write operation for the upper page is completed.

In a NAND flash memory, the page write order indicative of the order of pages necessary for writing data into each block is defined. For example, in a TLC flash memory, to prevent an effect caused by program disturbance, the page write order is defined such that write operation is applied to some neighboring word lines in turn.

For example, write operation is performed in the write order of write into the lower page of WL0, write into the lower page of WL1, write into the middle page of WL0, write into the lower page of WL2, write into the middle page of WL1, write into the upper page of WL0, write into the lower page of WL3, write into the middle page of WL2 and write into the upper page of WL1. In this way, the data written in one of the pages of a block becomes readable after data is written into some subsequent pages.

The write control unit 21 receives each write command from the host 2, and performs a write process for writing write data associated with each write command into the NAND flash memory 5. The write process includes (1) an address allocation operation for allocating the physical address to the write data, the physical address being indicative of the storage location in the NAND flash memory 5 into which write data should be written to the write data, (2) a data transfer operation for transferring the write data from the write buffer in the memory of the host 2, (3) a flash write operation (program operation) for writing the write data transferred from the write buffer in the memory of the host 2 into a write destination block, (4) an L2P update operation for updating the L2P table 31 such that the physical address allocated to the write data is associated with the logical address of the write data, etc.

In the present embodiment, as described above, the write control unit 21 supports the stream write operation for writing write data associated with different streams into different write destination blocks. As each write command received from the host 2 includes a stream ID, the write control unit 21 is capable of identifying a stream with which write data associated with each write command is associated.

In a host computing system such as the server of a data center, to support a large number of end users, the realization of an SSD allowed to use a large number of streams may be required.

However, if a configuration in which write data is transferred from the host 2 to the buffer in the SSD 3 every time a write command is received from the host 2 is used, the capacity of the buffer in the SSD needs to be large. Thus, it is necessary to prepare memory resources such as a large-capacity DRAM in the SSD 3. The cost of the SSD 3 will be increased.

In the present embodiment, the write control unit 21 performs the following write process to reduce required memory resources.

In the present embodiment, a plurality of submission queues corresponding to a plurality of streams are allocated in the memory of the host 2. Each submission queue is an I/O submission queue used for issuing a write command for writing write data associated with a stream corresponding to the submission queue to the SSD 3.

For example, each write command corresponding to the write data to be associated with a first stream is placed into a first submission queue corresponding to the first stream by the host 2. For example, each write command corresponding to the write data to be associated with a second stream is placed into a second submission queue corresponding to the second stream by the host 2.

The write control unit 21 checks a first total size indicative of the sum of the data lengths specified by the write commands stored in the first submission queue and associated with the first stream, and a second total size indicative of the sum of the data lengths specified by the write commands stored in the second submission queue and associated with the second stream.

In this case, the write control unit 21 checks the first total size and the second total size by checking the contents of the first submission queue and the second submission queue in a state where each write command is left in the first submission queue and the second submission queue. As each submission queue comprises a data structure allocated in the memory of the host 2, the write control unit 21 is capable of checking the contents of the first submission queue and the second submission queue by read-accessing the data structure in the memory of the host 2.

The write control unit 21 determines whether or not the first total size is greater than or equal to the minimum write size of the NAND flash memory 5. The minimum write size of the NAND flash memory 5 may be a page size, in other words, the size (for example, 16 kilobytes) of one page. In a case where a NAND flash memory chip including two planes is used for the NAND flash memory 5, write operation may be performed in parallel for two blocks selected from the two planes, respectively. In this case, a size (for example, 32 kilobytes) twice the page size may be used as the minimum write size of the NAND flash memory 5.

The minimum length of the write data specified by each write command is, for example, 4 kilobytes (or 512 bytes). Thus, the minimum write size of the NAND flash memory 5 is greater than the minimum size of the write data specified by each write command.

Until write commands equivalent to the minimum write size are accumulated in the first submission queue, the write control unit 21 does not fetch these write commands from the first submission queue. Even if these write commands are fetched, write operation for the NAND flash memory 5 cannot be started.

When a write command has been fetched, until the process for transferring write data corresponding to the write command from the write buffer in the memory of the host 2 to the internal buffer 16 is completed, the write command needs to be maintained in the memory (the DRAM 6 or SRAM) in the controller 4. Thus, as the number of streams used simultaneously is increased, a large amount of memory resources is needed to maintain each write command which has been already fetched and whose write cannot be started.

When the first total size is greater than or equal to the minimum write size of the NAND flash memory 5 by accumulating some subsequent write commands corresponding to the first stream in the first submission queue, the write control unit 21 fetches a set of write commands stored in the first submission queue. Based on the fetched set of write commands, the write control unit 21 transfers write data having the minimum write size and associated with the set of write commands from the write buffer in the memory of the host 2 to the internal buffer 16. As the write data transferred to the internal buffer 16 has the minimum write size, the write control unit 21 is capable of immediately writing the write data into the write destination block allocated for the first stream.

Similarly, until write commands equivalent to the minimum write size are accumulated in the second submission queue, the write control unit 21 does not fetch these write commands from the second submission queue.

When the second total size is greater than or equal to the minimum write size of the NAND flash memory 5 by accumulating some subsequent write commands corresponding to the second stream in the second submission queue, the write control unit 21 fetches a set of write commands stored in the second submission queue. Based on the fetched set of write commands, the write control unit 21 transfers write data having the minimum write size and associated with the set of write commands from the write buffer in the memory of the host 2 to the internal buffer 16. As the write data transferred to the internal buffer 16 has the minimum write size, the write control unit 21 is capable of immediately writing the write data into the write destination block allocated for the second stream.

The read control unit 22 receives a read command from the host 2 and reads the data specified by the received read command from the NAND flash memory 5.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A part of the storage region of the DRAM 6 may be used as the storage region of the L2P table 31. Another part of the storage region of the DRAM 6 may be used to store a submission queue (SQ)/total size management table 32. The SQ/total size management table 32 is management information which manages the correspondence relationship between queue identifiers identifying a plurality of submission queues and total sizes corresponding to the submission queues. For example, regarding a submission queue corresponding to a certain stream, the total size is indicative of the sum of the data lengths (the lengths of write data) specified by the write commands stored in this submission queue.

The DMAC 15 performs data transfer between the memory of the host 2 and the internal buffer 16 under the control of the CPU 12. When write data should be transferred from the write buffer in the memory of the host 2 to the internal buffer 16, the CPU 12 specifies the transfer source address indicative of the location on the write buffer in the memory of the host 2, the data size and the transfer destination address indicative of the location on the internal buffer 16 with respect to the DMAC 15.

When data should be written into the NAND flash memory 5, the ECC encode/decode unit 17 encodes (ECC-encodes) data (the data to be written), thereby adding an error correction code (ECC) to the data as a redundancy code. When data is read from the NAND flash memory 5, the ECC encode/decode unit 17 performs the error correction of the data (ECC-decoding), using the ECC added to the read data.

FIG. 5 illustrates a stream write operation for writing a plurality of types of write data associated with a plurality of streams into a plurality of write destination blocks corresponding to a plurality of streams, respectively.

FIG. 5 illustrates the following case. Write destination block BLK10 is associated with the stream of stream ID #1. Write destination block BLK20 is associated with the stream of stream ID #2. Write destination block BLK30 is associated with the stream of stream ID #3. Write destination block BLK40 is associated with the stream of stream ID #4. Write destination block BLK50 is associated with the stream of stream ID #5. Write destination block BLK60 is associated with the stream of stream ID #6. Write destination block BLK100 is associated with the stream of stream ID #n.

For example, an I/O service (virtual machine #1) corresponding to end user #1 issues write commands each including stream ID #1. An I/O service (virtual machine #2) corresponding to end user #2 issues write commands each including stream ID #2. An I/O service (virtual machine #n) corresponding to end user #n issues write commands each including stream ID #n.

The write data associated with a write command including stream ID #1 is written into write destination block BLK10. The write data associated with a write command including stream ID #2 is written into write destination block BLK20. The write data associated with a write command including stream ID #n is written into write destination block BLK100.

FIG. 6 illustrates the operation of allocating a plurality of write destination blocks corresponding to a plurality of streams from a free block group.

FIG. 6 illustrates, to simplify the figure, only two streams, specifically, the stream (stream #1) of stream ID #1 and the stream (stream #2) of stream ID #2.

The state of each block in the NAND flash memory 5 is roughly categorized into an active block in which valid data is stored and a free block in which valid data is not stored. Each block categorized as an active block is managed by a list referred to as an active block pool. Each block categorized as a free block is managed by a list referred to as a free block pool. Active block pool 101-1 is a list of blocks which store valid data associated with stream #1. Active block pool 101-n is a list of blocks which store valid data associated with stream #n. A free block pool 200 is a list of all free blocks. These free blocks are shared by a plurality of streams.

The controller 4 receives a set of write commands associated with the stream of stream ID #1 via a submission queue corresponding to the stream of stream ID #1. When the controller 4 receives the set of write commands, the controller 4 determines whether or not a write destination block (opened block) for stream #1 has been already allocated.

When a write destination block for stream #1 has not been allocated yet, the controller 4 allocates one of the free blocks of the free block pool 200 as a write destination block for stream #1. FIG. 6 illustrates a case where block BLK10 is allocated as a write destination block for stream #1. The controller 4 writes write data associated with each write command (each write command including stream ID #1) associated with the stream of stream ID #1 into block BLK10. When a write destination block for stream #1 has been already allocated, the controller 4 does not need to perform the operation of allocating a free block as a write destination block for stream #1.

When the write destination block (here, BLK10) for stream #1 is fully filled with write data from the host 2, the controller 4 manages (closes) write destination block BLK10 by active block pool 101-1 and allocates a free block of the free block pool 200 as a new write destination block (opened block) for stream #1.

When all valid data in a block in active block pool 101-1 is invalidated by data update, deallocation (unmapping, trimming), garbage collection, etc., the controller 4 moves the block to the free block pool 200 and causes the block to transition to a state where the block is available as a write destination block again.

The controller 4 receives a set of write commands associated with the stream of stream ID #n via a submission queue corresponding to the stream of stream ID #n. When the controller 4 receives the set of write commands, the controller 4 determines whether or not a write destination block (opened block) for stream #n has been already allocated.

When a write destination block for stream #n has not been allocated yet, the controller 4 allocates one of the free blocks of the free block pool 200 as a write destination block for stream #n. FIG. 6 illustrates a case where block BLK100 is allocated as a write destination block for stream #n. The controller 4 writes write data associated with each write command (each write command including stream ID #n) associated with the stream of stream ID #n into block BLK100. When a write destination block for stream #n has been already allocated, the controller 4 does not need to perform the operation of allocating a free block as a write destination block for stream #n.

When the write destination block (here, BLK100) for stream #n is fully filled with write data from the host 2, the controller 4 manages (closes) write destination block BLK100 by active block pool 101-n and allocates a free block of the free block pool 200 as a new write destination block (opened block) for stream #n.

When all valid data in a block in active block pool 101-n is invalidated by data update, deallocation (unmapping, trimming), garbage collection, etc., the controller 4 moves the block to the free block pool 200 and causes the block to transition to a state where the block is available as a write destination block again.

Figure 7:
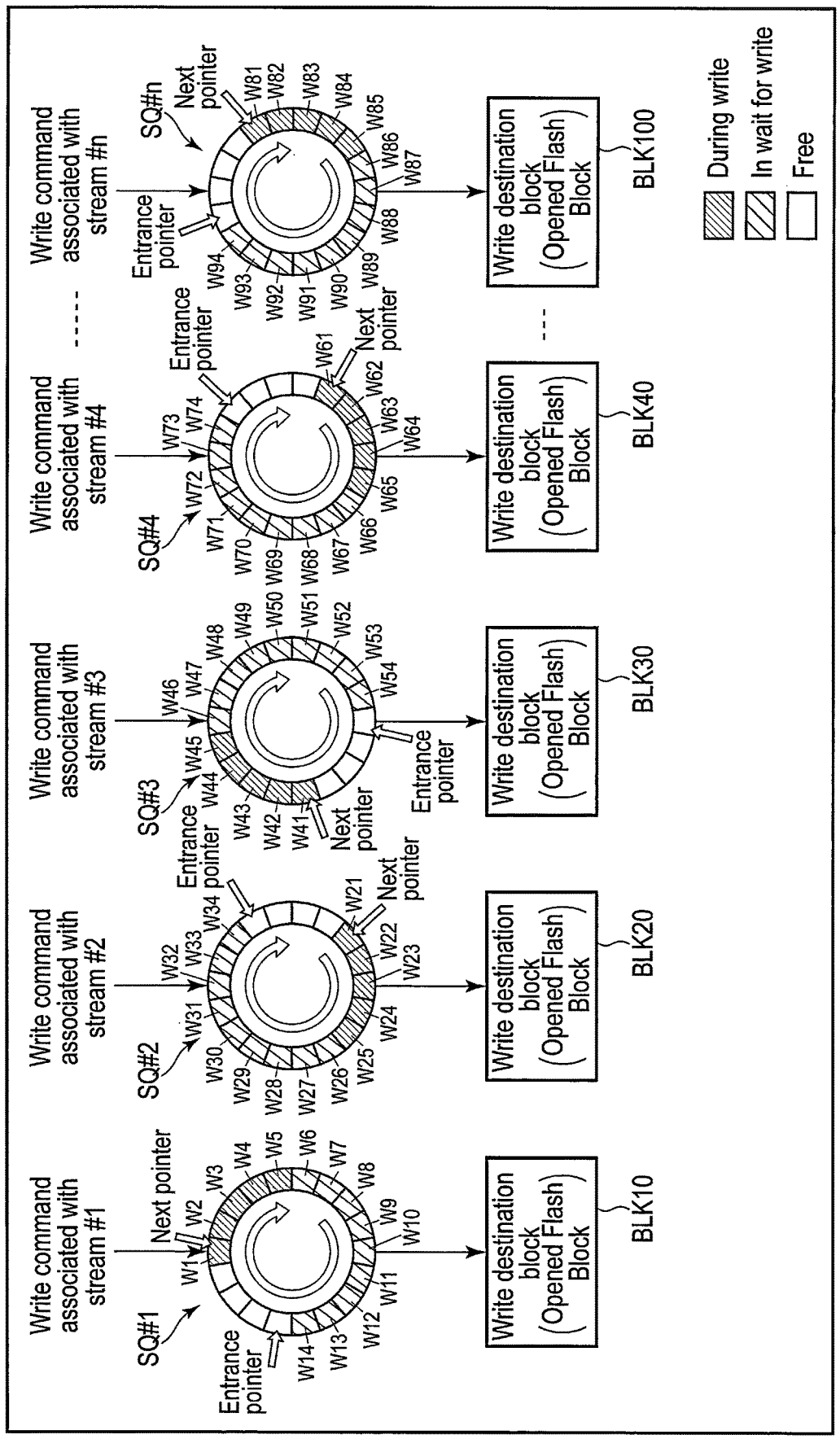
FIG. 7 is a diagram illustrating a plurality of submission queues corresponding to a plurality of write destination blocks, respectively.

FIG. 7 illustrates a plurality of submission queues corresponding to a plurality of write destination blocks, respectively.

In the present embodiment, as illustrated in FIG. 7, dedicated submission queues SQ #1 to SQ #n corresponding to a plurality of streams #1 to #n (a plurality of write destination blocks), respectively, are allocated in the memory of the host 2. Each of submission queues SQ #1 to SQ #n may be realized by a circular buffer (circular queue). The queue depth of each of submission queues SQ #1 to SQ #n (the number of entries of each queue) is greater than a quotient obtained by dividing the minimum write size of the NAND flash memory 5 by the minimum length of the write data specified by each write command.

Each of submission queues SQ #1 to SQ #n is controlled by two corresponding pointers (a next pointer and an entrance pointer).

The next pointer corresponds to a submission queue head pointer having the NVMe specification. The entrance pointer corresponds to a submission queue tail pointer having the NVMe specification. The entrance pointer is a pointer to indicate the entry in the submission queue in which the next command should be placed. The value of the entrance pointer is updated by the host 2. The next pointer is a pointer indicative of the entry in the submission queue from which the next command should be fetched. The value of the next pointer is updated by the controller 4 of the SSD 3.

In each submission queue, the write of a write command into the submission queue and the read of a write command from the submission queue are performed by a first-in first-out method.

Submission queue SQ #1 is an I/O submission queue dedicated to stream #1, and is allocated in the memory of the host 2 to store each write command corresponding to the write data to be associated with stream #1. Submission queue SQ #1 is used to issue each write command associated with stream #1 to the controller 4. In other words, all the write commands for write destination block BLK10 for stream #1 (all the write commands corresponding to the write data to be associated with stream #1) are placed in submission queue SQ #1 by host software.

In each of submission queues SQ #1 to SQ #n, fine diagonal hatching lines are indicative of a group of entries (slots) in which write commands during write are stored, and rough diagonal hatching lines are indicative of a group of entries (slots) in which write commands in wait for write are stored, and blanks are indicative of a group of entries (slots) in a free state in which a write command is not stored.

FIG. 7 illustrates a case where, in submission queue SQ #1, write commands W1 to W14 corresponding to the write data to be associated with stream #1 are accumulated in submission queue SQ #1. The sum of the data lengths specified by write commands W1 to W5 is greater than or equal to the minimum write size.

When the controller 4 detects the sum of the data lengths specified by write commands W1 to W5 is greater than or equal to the minimum write size, the controller 4 starts a write process corresponding to a set of write commands W1 to W5 by processing the set of write commands W1 to W5. In this case, the controller 4 fetches write commands W1 to W5 stored in submission queue SQ #1, transfers the write data associated with the set of write commands W1 to W5 and having the minimum write size from the write buffer in the memory of the host 2 to the internal buffer 16, and writes the write data into write destination block BLK10.

FIG. 7 illustrates a case where, in submission queue SQ #2, write commands W21 to W34 corresponding to the write data to be associated with stream #2 are accumulated in submission queue SQ #2. When the controller 4 detects that the sum of the data lengths specified by write commands W21 to W25 is greater than or equal to the minimum write size, the controller 4 starts a write process corresponding to a set of write commands W21 to W25 by processing the set of write commands W21 to W25. In this case, the controller 4 fetches write commands W21 to W25 stored in submission queue SQ #2, transfers the write data associated with the set of write commands W21 to W25 and having the minimum write size from the write buffer in the memory of the host 2 to the internal buffer 16, and writes the write data into write destination block BLK20.

FIG. 7 illustrates a case where, in submission queue SQ #3, write commands W41 to W54 corresponding to the write data to be associated with stream #3 are accumulated in submission queue SQ #3. When the controller 4 detects that the sum of the data lengths specified by write commands W41 to W45 is greater than or equal to the minimum write size, the controller 4 starts a write process corresponding to a set of write commands W41 to W45 by processing the set of write commands W41 to W45. In this case, the controller 4 fetches write commands W41 to W45 stored in submission queue SQ #3, transfers the write data associated with the set of write commands W41 to W45 and having the minimum write size from the write buffer in the memory of the host 2 to the internal buffer 16, and writes the write data into write destination block BLK30.

FIG. 7 illustrates a case where, in submission queue SQ #4, write commands W61 to W74 corresponding to the write data to be associated with stream #4 are accumulated in submission queue SQ #4. When the controller 4 detects that the sum of the data lengths specified by write commands W61 to W65 is greater than or equal to the minimum write size, the controller 4 starts a write process corresponding to a set of write commands W61 to W65 by processing the set of write commands W61 to W65. In this case, the controller 4 fetches write commands W61 to W65 stored in submission queue SQ #4, transfers the write data associated with the set of write commands W61 to W65 and having the minimum write size from the write buffer in the memory of the host 2 to the internal buffer 16, and writes the write data into write destination block BLK40.

FIG. 7 illustrates a case where, in submission queue SQ #n, write commands W81 to W94 corresponding to the write data to be associated with stream #n are accumulated in submission queue SQ #n. When the controller 4 detects that the sum of the data lengths specified by write commands W81 to W85 is greater than or equal to the minimum write size, the controller 4 starts a write process corresponding to a set of write commands W81 to W85 by processing the set of write commands W81 to W85. In this case, the controller 4 fetches write commands W81 to W85 stored in submission queue SQ #n, transfers the write data associated with the set of write commands W81 to W85 and having the minimum write size from the write buffer in the memory of the host 2 to the internal buffer 16, and writes the write data into write destination block BLK100.

Figure 8:
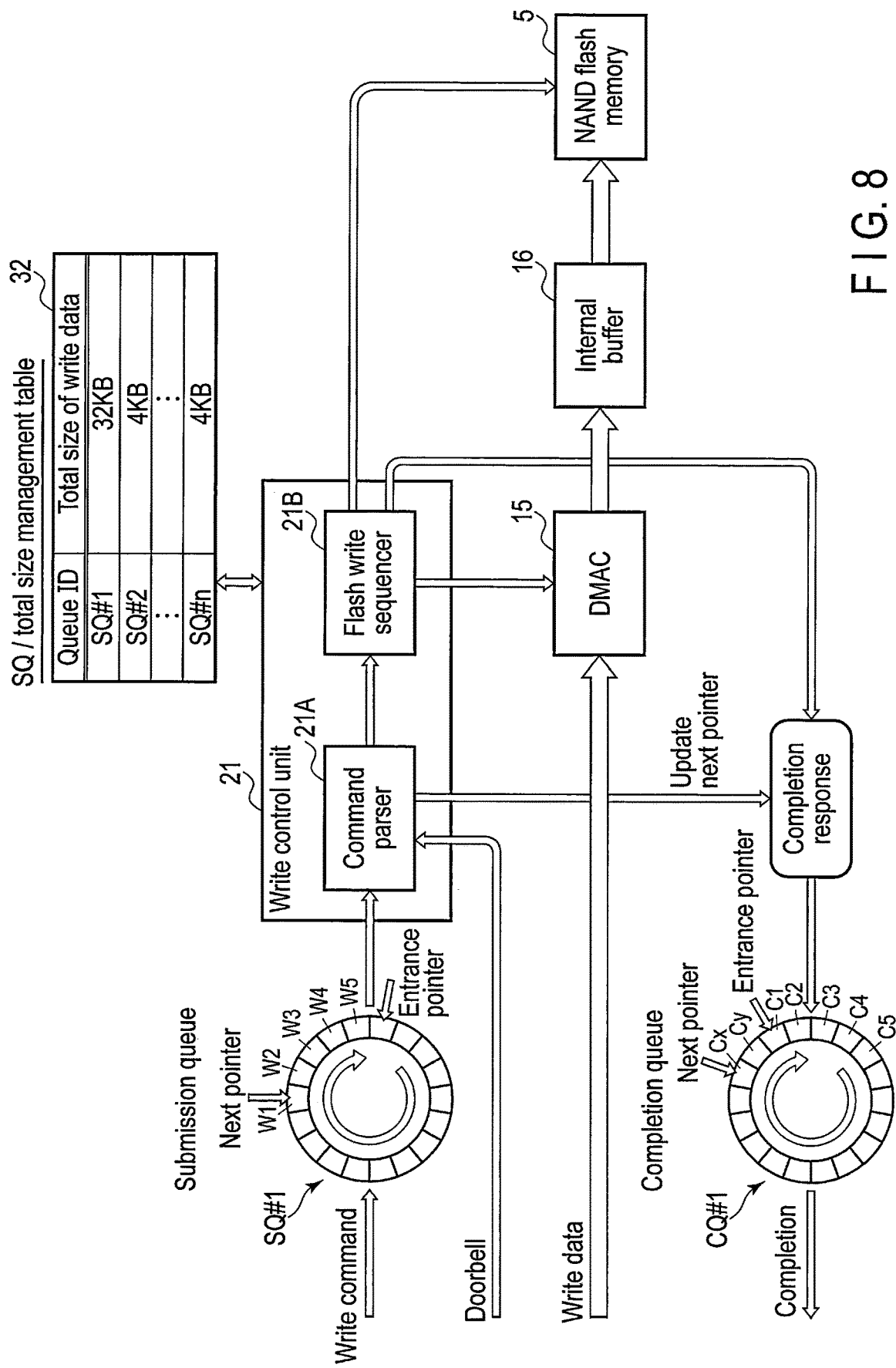
FIG. 8 is a block diagram illustrating the configuration of a write control unit provided in the memory system and a write process performed in the memory system according to the embodiment.

FIG. 8 is a block diagram illustrating the configuration of the write control unit 21 and a write process performed in the SSD 3.

The write control unit 21 includes a command parser 21A and a flash write sequencer 21B. The command parser 21A performs a prefetch process, a fetch process, a command interpretation process, a next pointer update process, etc.

In the prefetch process, total sizes corresponding to submission queues SQ #1 to SQ #n are checked, and the SQ/total size management table 32 is updated based on the result of the check. In a fetch process, one or more write commands are fetched from a submission queue SQ. In a command interpretation process, the content of each fetched write command is interpreted. In a next pointer update process, the host 2 is notified of the submission queue entry in which a fetched write command is stored (the last fetched submission queue entry) by updating the value of the next pointer. In this way, the host 2 is capable of reusing the last fetched submission queue entry for storing a new write command.

The flash write sequencer 21B controls a write sequence for writing data into the NAND flash memory 5. A write sequence includes a data transfer operation for transferring write data from the write buffer in the memory of the host 2 to the internal buffer 16 using the DMAC 15, a flash write operation (program operation) for writing write data into a write destination block and the operation of returning a response (completion response) indicative of the completion of a write command to the host 2. Since a plurality of write destination blocks are simultaneously opened, the flash write sequencer 21B may adjust the timing of a write sequence corresponding to each write destination block such that a write sequence for writing data having the minimum write size into a write destination block and a write sequence for writing data having the minimum write size into another write destination block are performed in a pipeline manner.

When the host 2 places one or more new write commands corresponding to stream #1 into submission queue SQ #1, the host 2 notifies the controller 4 that one or more new write commands are stored in submission queue SQ #1 (doorbell). In this case, the host 2 updates a doorbell register corresponding to submission queue SQ #1 in the controller 4 with the new value of an entrance pointer corresponding to submission queue SQ #1. When this notification (doorbell) is received, the command parser 21A checks the content (data length) of one or more new write commands in submission queue SQ #1 in a state where each write command is left in submission queue SQ #1. Unless the value of a next pointer corresponding to submission queue SQ #1 is advanced, the submission queue entry in which each write command is stored is not released. When the command parser 21A does not update the value of a next pointer corresponding to submission queue SQ #1, the command parser 21A is capable of checking the content (data length) of one or more new write commands in submission queue SQ #1 in a state where each write command is left in submission queue SQ #1.

The SQ/total size management table 32 is updated such that the total size of the current write data corresponding to submission queue SQ #1 is increased only by the sum of the data lengths specified by one or more new write commands.

When write commands W1 to W5 are accumulated in submission queue SQ #1 by the host 2, and the sum (total size) of the data lengths specified by write commands W1 to W5 is greater than or equal to the minimum write size (for example, 32 kilobytes), the write control unit 21 starts a write process corresponding to a set of write commands W1 to W5.

In this case, the command parser 21A fetches write commands W1 to W5 from submission queue SQ #1. Each of fetched write commands W1 to W5 includes a data pointer indicative of the location in the memory of the host 2 in which corresponding write data is stored. The flash write sequencer 21B transfers write data corresponding to the set of write commands W1 to W5 from the write buffer in the memory of the host 2 to the internal buffer 16, using the DMAC 15. The write data transferred to the internal buffer 16 has the minimum write size. The flash write sequencer 21B transfers the write data transferred to the internal buffer 16 to the NAND flash memory 5, and writes the write data into write destination block BLK10 allocated for stream #1.

After the write of write data into write destination block BLK10 is completed, the flash write sequencer 21B returns completion responses C1 to C5 corresponding to write commands W1 to W5, respectively, to the host 2. These completion responses C1 to C5 are placed in completion queue CQ #1 in the memory of the host 2 by the controller 4.

Completion queue CQ #1 may be also realized by a circular buffer (circular queue). Completion queue CQ #1 is also controlled by two pointers (a next pointer and an entrance pointer). Each completion queue entry in completion queue CQ #1 includes a region in which a submission queue next pointer (submission queue head pointer) is stored. Such that a submission queue next pointer corresponding to submission queue SQ #1 is indicative of the next entry of write command W5, the command parser 21A updates the submission queue next pointer. Each of completion responses C1 to C5 including the value of the updated submission queue next pointer is placed in completion queue CQ #1. In this way, the host 2 is allowed to be notified of the last fetched submission queue entry.

Figure 9:
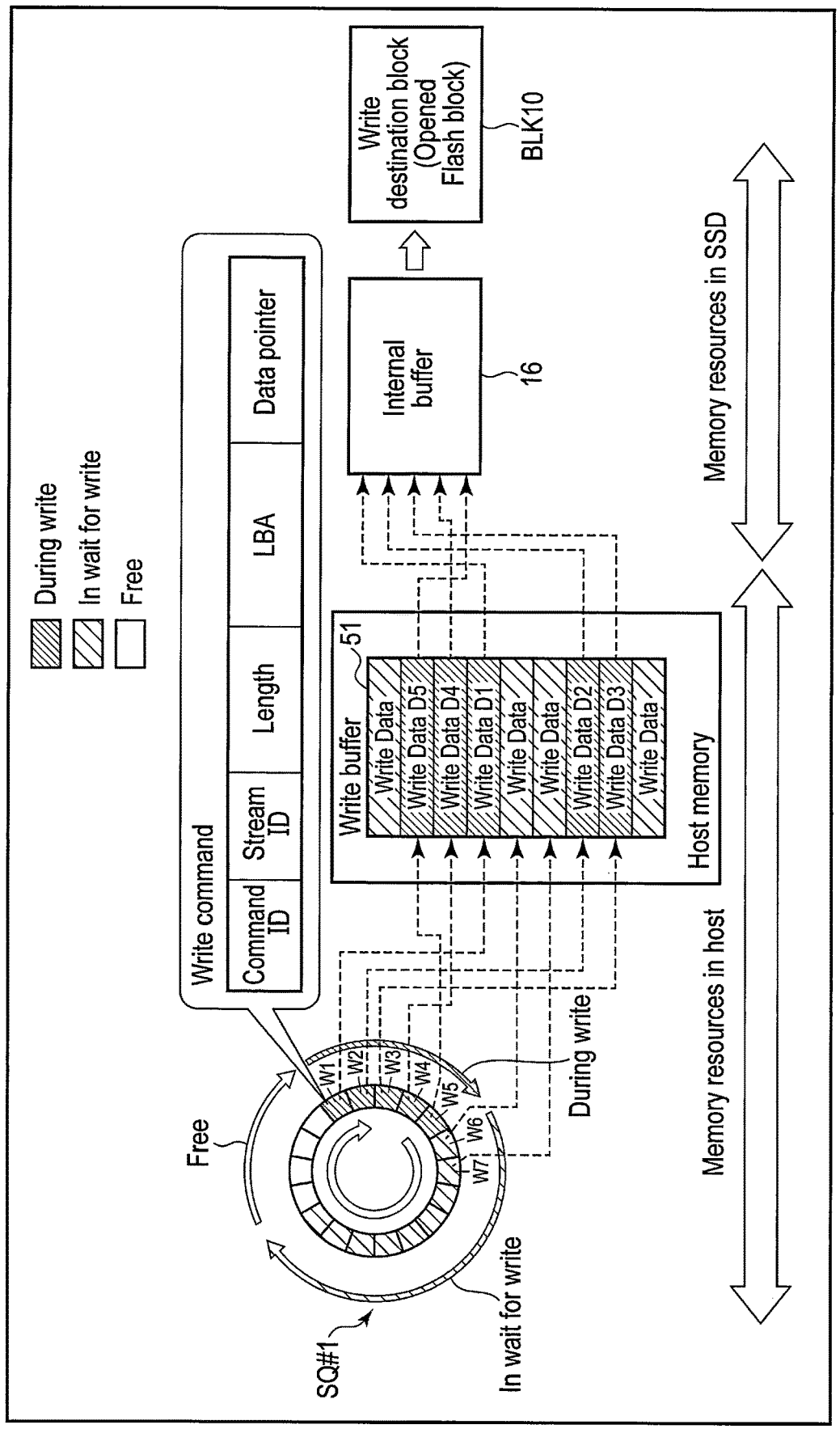
FIG. 9 is a diagram illustrating the relationship between memory resources in the host and memory resources in the memory system according to the embodiment.

FIG. 9 illustrates the relationship between memory resources in the host 2 and memory resources in the SSD 3.

Each write command includes a command ID, a stream ID, a length, a logical block address (LBA), a data pointer, etc. The command ID is an identifier for identifying the write command. The stream ID is the identifier of the stream associated with the write command. The length is indicative of the length of the write data associated with the write command. The LBA is indicative of the starting logical address into which the write data associated with the write command should be written. The data pointer is indicative of the location in the write buffer 51 of the memory of the host 2 in which the write data associated with the write command is stored.

Now, it is assumed that write commands W1 to W5 are stored in submission queue SQ #1. The data pointer in write command W1 is indicative of the location in the write buffer 51 in which write data D1 associated with write command W1 is present. The data pointer in write command W2 is indicative of the location in the write buffer 51 in which write data D2 associated with write command W2 is present. Similarly, the data pointer in write command W5 is indicative of the location in the write buffer 51 in which write data D5 associated with write command W5 is present.

Thus, each command includes various types of information. In the SSD 3 allowed to simultaneously use a large number of streams, if a configuration in which, every time one or more write commands are placed in a submission queue, these write commands are fetched from the submission queue, is employed, large-capacity memory resources capable of storing a large number of write commands in wait for write need to be prepared in the SSD 3.

In the present embodiment, a plurality of dedicated submission queues corresponding to a plurality of streams, respectively, are allocated in the memory of the host 2. Until write commands for the minimum write size are accumulated in a submission queue, a write command is not fetched from any submission queue. When write commands for the minimum write size are accumulated in a submission queue, these write commands are fetched, and write data is transferred, and a flash write operation is performed. Thus, there is no need to store a large number of write commands in wait for write in the SSD 3.

In addition, as write commands corresponding to different streams are not present in the same submission queue, it is possible to prevent a situation (blocking) in which write commands corresponding to a stream having a large amount of write data cannot be fetched from the submission queue by write commands in wait for write corresponding to another stream having a small amount of write data.

Furthermore, as write data having the minimum write size is transferred from the write buffer 51 in the host memory to the internal buffer 16, it is possible to immediately start to write the write data having the minimum write size and transferred to the internal buffer 16 into a write destination block. Thus, the internal buffer 16 can be shared by a plurality of streams. Even when the number of streams to be supported by the SSD 3 is increased, a stream write operation can be effectively performed by merely preparing only the internal buffer 16 having the minimum write size.

Figure 10:
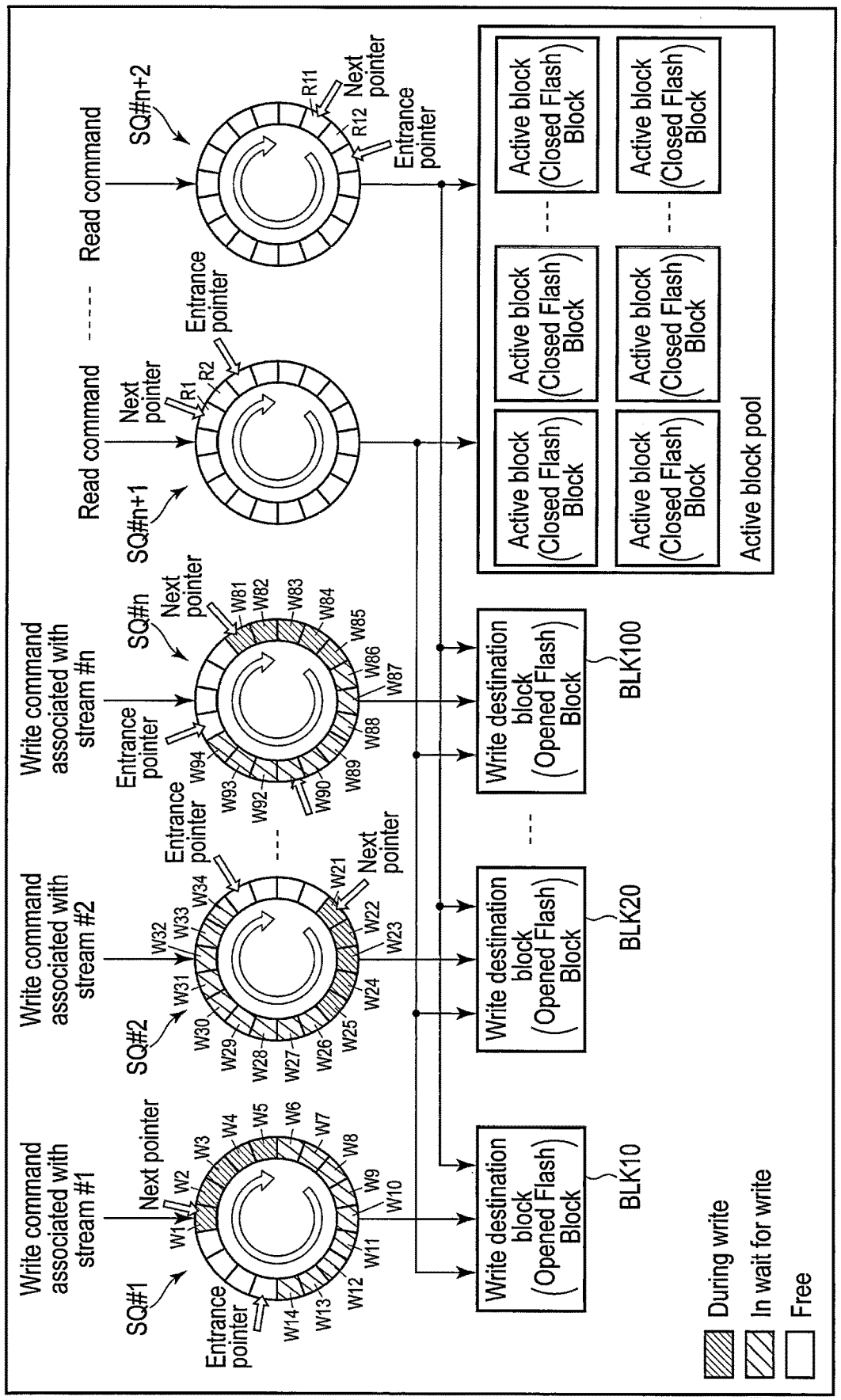
FIG. 10 is a diagram illustrating a plurality of submission queues allocated in the memory of the host for storing a plurality of types of write commands corresponding to a plurality of streams.

FIG. 10 illustrates a plurality of submission queues allocated in the memory of the host 2 for storing a plurality of types of write commands corresponding to a plurality of streams.

In the present embodiment, only each write command corresponding to stream #1 is placed in submission queue SQ #1 dedicated to stream #1 by the host 2. The host 2 does not place any read command in submission queue SQ #1. Only each write command corresponding to stream #2 is placed in submission queue SQ #2 dedicated to stream #2 by the host 2. The host 2 does not place any read command in submission queue SQ #2. Similarly, only each write command corresponding to stream #n is placed in submission queue SQ #n dedicated to stream #n by the host 2. The host 2 does not place any read command in submission queue SQ #n.

This configuration prevents a situation (blocking) in which a read command cannot be fetched from a submission queue by a write command stored in the submission queue and waiting for write.

Read commands are placed in submission queues SQ #n+1 and SQ #n+2 different from submission queues SQ #1 to SQ #n by the host 2. FIG. 10 illustrates a case where read commands R1 and R2 are placed in submission queue SQ #n+1 by the host 2, and read commands R11 and R12 are placed in submission queue SQ #n+2 by the host 2. Each of read commands R1, R2, R11 and R12 may be a read command which requests to read data stored in an active block or a read command which requests to read data written in a block currently opened as a write destination block.

Figure 11:
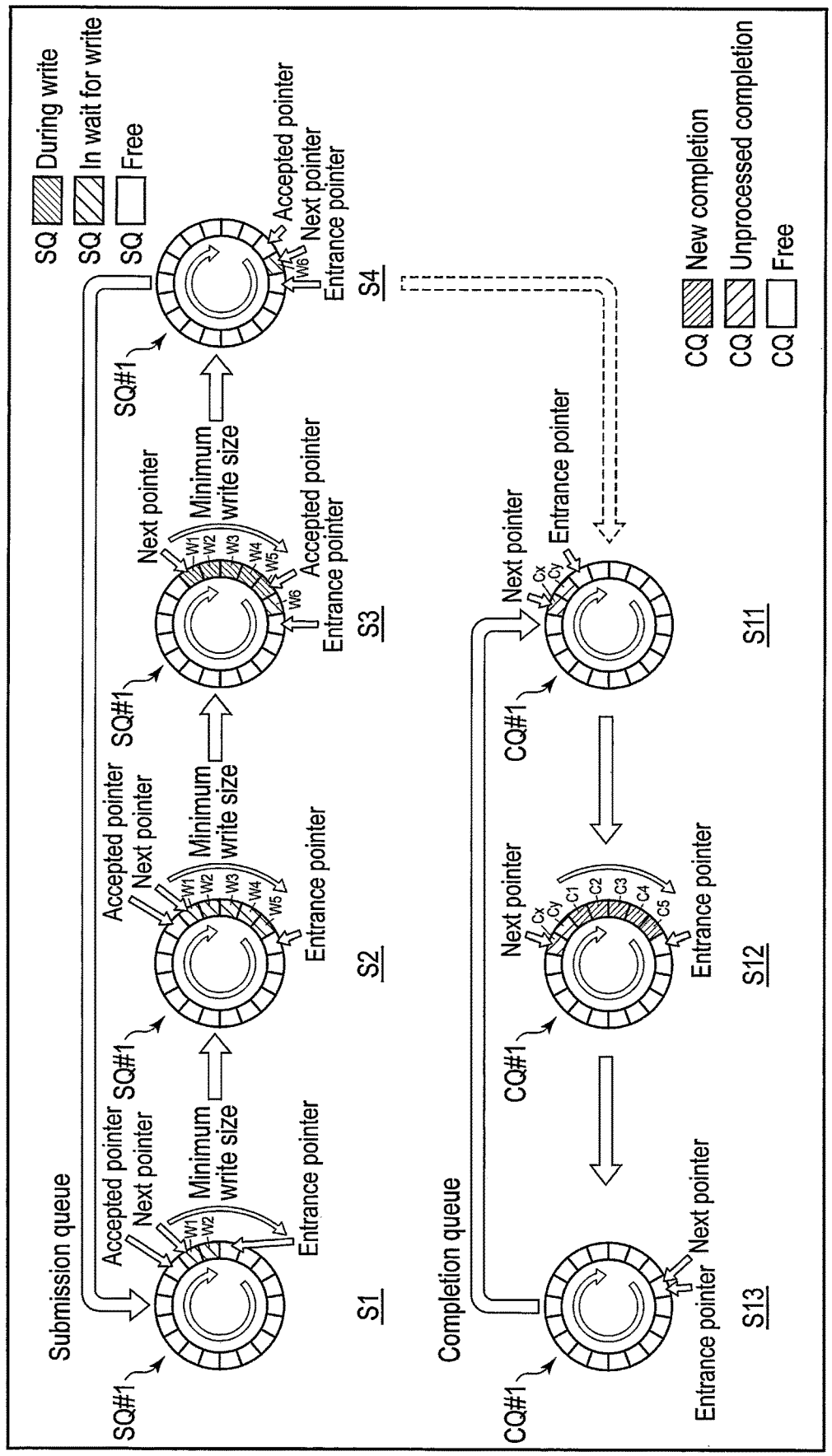
FIG. 11 is a diagram illustrating the state transition of a submission queue and the state transition of a completion queue.

FIG. 11 illustrates the state transition of a submission queue and the state transition of a completion queue.

The upper part of FIG. 11 illustrates the state transition of a submission queue. Here, the state transition of a submission queue is explained by illustrating submission queue SQ #1. State S1 is a state waiting for accumulation of write commands for the minimum write size in submission queue SQ #1. In state S1, for example, only write commands W1 and W2 are stored in submission queue SQ #1. The sum of the data length specified by write command W1 and the data length specified by write command W2 is less than the minimum write size. Thus, write commands W1 and W2 are write commands in wait for write. An accepted pointer is a pointer internally managed by the controller 4 and is indicative of the last fetched submission queue entry.

When subsequent write commands W3 to W5 are placed in submission queue SQ #1 by the host, and the sum of the data lengths specified by write commands W1 to W5 is greater than or equal to the minimum write size, the state of submission queue SQ #1 transitions to state S2. State S2 is a state where a write process corresponding to a set of write commands W1 to W5 can be started. The controller 4 fetches write commands W1 to W5 from submission queue SQ #1. In this way, the state of submission queue SQ #1 transitions to state S3.

State S3 is a state where a write process corresponding to the set of write commands W1 to W5 is in process. Since write commands W1 to W5 are fetched, the value of the accepted pointer is updated such that the value is indicative of the entry in which write command W5 is stored. The controller 4 transfer the write data having the minimum write size and associated with the set of write commands W1 to W5 from the write buffer 51 of the host 2 to the internal buffer 16 and writes the write data into write destination block BLK10.

Subsequent write command W6 corresponding to stream #1 is placed in the entry of submission queue SQ #1 indicated by the entrance pointer. Subsequently, the value of the entrance pointer is advanced by one.

When the write process of the write data associated with the set of write commands W1 to W5 is completed, the state of submission queue SQ #1 transitions to state S4. In state S4, the value of the next pointer is updated such that the value is indicative of the entry in which write command W6 is stored.

The lower part of FIG. 11 illustrates the state transition of a completion queue. Here, the state transition of a completion queue is explained by illustrating completion queue CQ #1. State S11 is a state waiting for the controller 4 to place a new completion response in completion queue CQ #1. Completion responses Cx and Cy stored in completion queue CQ #1 are indicative of completion responses which have not been processed by the host 2 yet. State S12 is indicative of a state where new completion responses C1 to C5 corresponding to write commands W1 to W5 are placed in completion queue CQ #1 by the controller 4. When new completion replies C1 to C5 are placed in completion queue CQ #1, the value of an entrance pointer corresponding to completion queue CQ #1 is updated by the controller 4 such that the value is indicative of the next entry of completion response C5. When completion responses Cx, Cy and C1 to C5 are processed by the host 2, the state of completion queue CQ #1 transitions to state S13. State S13 is a state where completion queue CQ #1 is free, and the value of an entrance pointer corresponding to completion queue CQ #1 is updated by the host 2 such that the value is indicative of the same entry as the next pointer.

FIG. 12 illustrates the configuration examples of the host 2 and the SSD 3 with regard to data write.

In the host 2, each write command corresponding to the write data to be associated with stream #1 is placed in submission queue SQ #1 dedicated to stream #1. Each write command corresponding to the write data to be associated with stream #2 is placed in submission queue SQ #2 dedicated to stream #2. Each write command corresponding to the write data to be associated with stream #n is placed in submission queue SQ #n dedicated to stream #n.

Each write command includes the LBA of write data, the length of the write data, a stream ID, the data pointer indicative of the location in the write buffer 51 in which the write data is stored. A completion response indicative of the completion of each write command is placed in completion queue CQ #1 shared by submission queues SQ #1 to SQ #n by the controller 4. Completion queues CQ #1 to CQ #n corresponding to submission queues SQ #1 to SQ #n, respectively, may be allocated in the memory of the host 2.

The write data associated with each write command is stored in the write buffer 51 in the host memory. In the write buffer 51, a plurality of regions corresponding to streams #1 to #n may be allocated. In this case, the write data associated with stream #1 is stored in a region corresponding to stream #1 in the write buffer 51. The write data associated with stream #2 is stored in a region corresponding to stream #2 in the write buffer 51. The write data associated with stream #n is stored in a region corresponding to stream #n in the write buffer 51.

In the SSD 3, the write control unit 21 checks the total size indicative of the sum of the data lengths specified by the write commands stored in submission queue SQ #1, the total size indicative of the data lengths specified by the write commands stored in submission queue SQ #2 and the total size indicative of the sum of the data lengths specified by the write commands stored in submission queue SQ #n, and updates the SQ/total size management table 32 based on the result of the check.

For example, when the write control unit 21 receives a notification indicative that one or more new write commands are stored in submission queue SQ #1 from the host 2, the write control unit 21 checks the total size indicative of the sum of the data lengths specified by the write commands currently stored in submission queue SQ #1, and changes the value of a total size corresponding to the queue ID of submission queue SQ #1. In this case, the write control unit 21 may check only the data lengths specified by one or more commands newly placed in submission queue SQ #1 and change the value of a total size corresponding to the queue ID of submission queue SQ #1 such that a current total size corresponding to submission queue SQ #1 is increased by only the sum of the data lengths specified by one or more new write commands.

Similarly, when the write control unit 21 receives a notification indicative that one or more new write commands are stored in submission queue SQ #2 from the host 2, the write control unit 21 checks the total size indicative of the sum of the data lengths specified by the write commands currently stored in submission queue SQ #2, and changes the value of a total size corresponding to the queue ID of submission queue SQ #2. In this case, the write control unit 21 may check only the data lengths specified by one or more commands newly placed in submission queue SQ #2 and change the value of a total size corresponding to the queue ID of submission queue SQ #2 such that a current total size corresponding to submission queue SQ #2 is increased by only the sum of the data lengths specified by one or more new write commands.

When the total size of write data corresponding to a set of write commands stored in a submission queue is greater than or equal to the minimum write size, the write control unit 21 fetches these write commands from the submission queue. The write control unit 21 transmits, to the DMAC 15, a transfer request to transfer the write data associated with the set of write commands and having the minimum write size from the write buffer 51 in the host memory to the internal buffer 16. When the DMAC 15 receives the transfer request, the DMAC 15 transfers the write data having the minimum write size from the write buffer 51 in the host memory to the internal buffer 16 by performing DMA transfer. The write control unit 21 issues a program instruction (write instruction) to the NAND interface 13 and writes the write data transferred to the internal buffer 16 and having the minimum write size into a write destination block in the NAND flash memory 5.

After the write of the write data having the minimum write size into the write destination block is completed, the write control unit 21 returns responses each indicative of the completion of each write command to the host 2. The responses each indicative of the completion of each write command are placed in completion queue CQ #1 by the write control unit 21.

Figure 13:
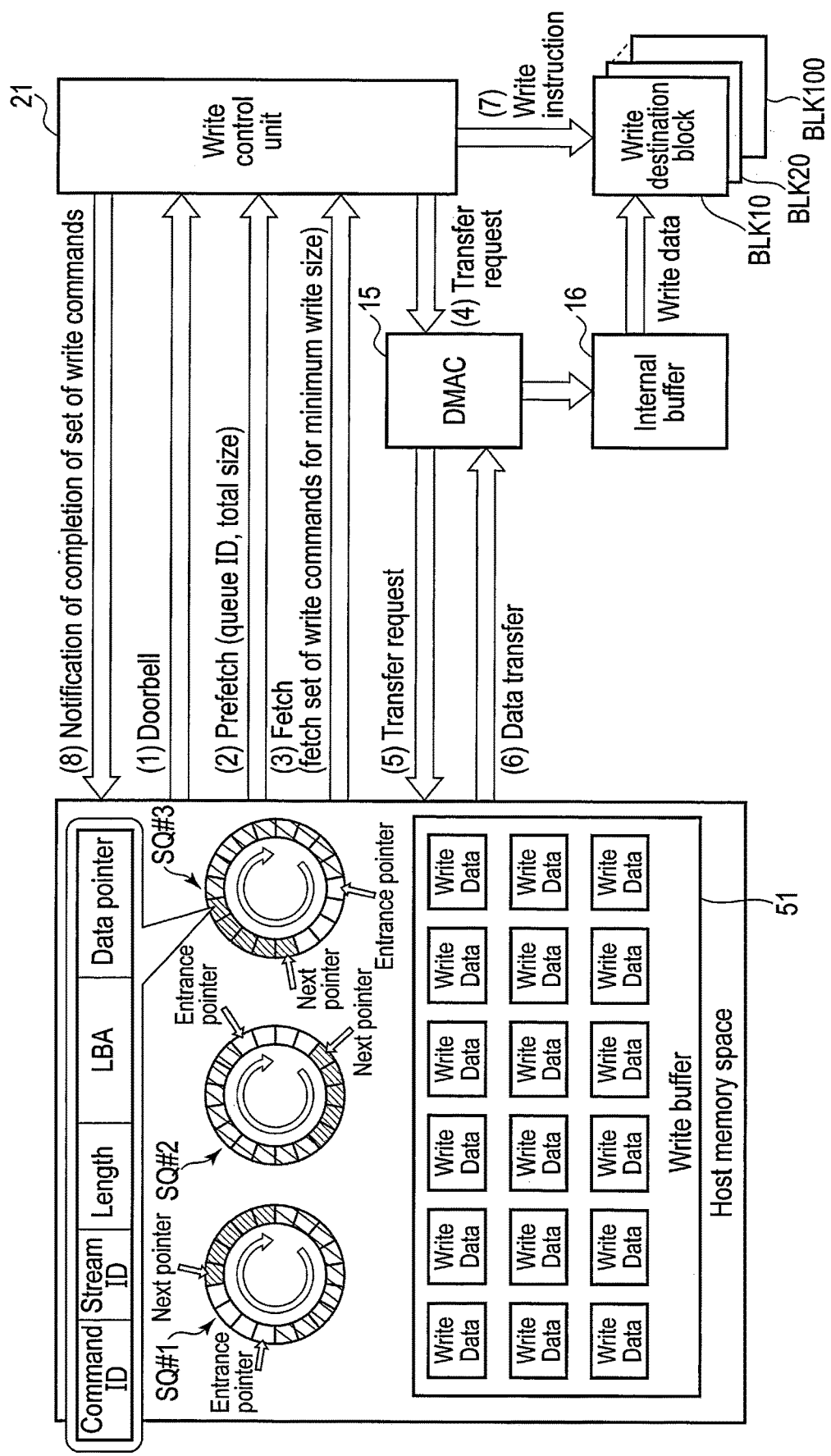
FIG. 13 is a diagram illustrating each message exchanged between the host and the memory system according to the embodiment.

FIG. 13 illustrates each message exchanged between the host 2 and the SSD 3.

FIG. 13 illustrates a case where submission queues SQ #1 to SQ #3 corresponding to streams #1 to #3 and the write buffer 51 are allocated to the host memory.

(1) Doorbell: When the host 2 places one or more write commands corresponding to stream #1 in submission queue SQ #1, the host 2 updates the value of a doorbell register in the controller 4 corresponding to submission queue SQ #1 with a new value of an entrance pointer corresponding to submission queue SQ #1, thereby notifying the SSD 3 that one or more write commands are placed in submission queue SQ #1. The difference between the previous value of the doorbell register and the new value is indicative of the number of new write commands placed in submission queue SQ #1. When the host 2 places one or more write commands corresponding to stream #2 in submission queue SQ #2, the host 2 updates the value of a doorbell register in the controller 4 corresponding to submission queue SQ #2 with a new value of an entrance pointer corresponding to submission queue SQ #2, thereby notifying the SSD 3 that one or more write commands are placed in submission queue SQ #2. When the host 2 places one or more write commands corresponding to stream #3 in submission queue SQ #3, the host 2 updates the value of a doorbell register in the controller 4 corresponding to submission queue SQ #3 with a new value of an entrance pointer corresponding to submission queue SQ #3, thereby notifying the SSD 3 that one or more write commands are placed in submission queue SQ #3.

(2) Prefetch: The write control unit 21 of the controller 4 of the SSD 3 checks the total size of write data corresponding to a set of write commands stored in each submission queue by checking the content of each submission queue in a state where each write command is left in each of submission queues SQ #1 to SQ #3. For example, when the write control unit 21 receives a notification indicative that one or more write commands are placed in submission queue SQ #1 from the host 2, the write control unit 21 checks the data length specified by each new write command stored in submission queue SQ #1 in the host memory, and updates a total size corresponding to submission queue SQ #1 such that a total size corresponding to submission queue SQ #1 is increased by only the sum of the data lengths specified by the new write commands. Similarly, when the write control unit 21 receives a notification indicative that one or more write commands are placed in submission queue SQ #2 from the host 2, the write control unit 21 checks the data length specified by each new write command stored in submission queue SQ #2 in the host memory, and updates a total size corresponding to submission queue SQ #2 such that a total size corresponding to submission queue SQ #2 is increased by only the sum of the data lengths specified by the new write commands. When a total size corresponding to a certain submission queue is greater than or equal to the minimum write size, a write process corresponding to a set of write commands stored in this submission queue can be started.

(3) Fetch: When a write process corresponding to a set of write commands stored in a certain submission queue can be started, the write control unit 21 fetches the set of write commands stored in this submission queue.

(4) Transfer request: The write control unit 21 transmits, to the DMAC 15, a transfer request to obtain write data corresponding to the fetched set of write commands from the write buffer 51 of the host 2.

(5) (6): The DMAC 15 transfers write data having the minimum write size from the write buffer 51 in the host memory to the internal buffer 16 by performing DMA transfer.

(7) Write instruction: The write control unit 21 issues a program instruction (write instruction) to the NAND interface 13 and writes the write data transferred to the internal buffer 16 and having the minimum write size into a write destination block in the NAND flash memory 5.

(8) Completion response: The write control unit 21 returns completion responses corresponding to fetched write commands to the host 2.

The flowchart of FIG. 14 illustrates the procedure of a write process performed in the SSD 3.

Here, it is assumed that write destination blocks BLK10 to BLK 100 corresponding to streams #1 to #n have been already allocated by the controller 4.

The controller 4 checks the size (total size) of write data corresponding to a set of write commands stored in each of submission queues SQ #1 to SQ #n corresponding to streams #1 to #n (step S21). In step S21, the controller 4 compares the size (total size) of write data corresponding to each of submission queues SQ #1 to SQ #n with the minimum write size, thereby detecting a submission queue in which the total size reaches the minimum write size of the NAND flash memory 5. Thus, in step S21, the controller 4 determines, for each of submission queues SQ #1 to SQ #n. Whether or not the total size reaches the minimum write size.

When the controller 4 detects a submission queue in which the total size reaches the minimum write size (YES in step S22), the controller 4 fetches a set of write commands in which the total size is greater than or equal to the minimum write size from the detected submission queue (step S23). The controller 4 transfers the write data associated with the set of write commands and having the minimum write size from the write buffer 51 of the host 2 to the internal buffer 16 of the controller 4, based on the data length and the data pointer which are specified by each of the write commands (step S24).

The controller 4 writes the write data transferred to the internal buffer 16 and having the minimum write size into a write destination block allocated for a stream corresponding to the detected submission queue (step S25). After the write of the write data into the write destination block is completed, the controller 4 returns a set of command completion responses corresponding to the set of write commands to the host 2 such that a set of command completion responses corresponding to the set of write commands is placed in a completion queue corresponding to the detected submission queue (step S26). The controller 4 may return a set of command completion response corresponding to the set of write commands to the host 2 after the completion of the transfer of the write data for the minimum write size from the write buffer 51 to the internal buffer 16.

The flowchart of FIG. 15 illustrates the procedure of a process performed in the host 2.

The host 2 is realized as an information processing apparatus including a processor (CPU) and a memory. The processor allocates submission queues SQ #1 to SQ #n dedicated to streams #1 to #n in the memory. The processor specifies a stream corresponding to the write command to be issued to the SSD 3 and places the write command in the submission queue dedicated to the specified stream.

In other words, the processor firstly determines whether or not the write command to be issued to the SSD 3 is a write command corresponding to the write data to be associated with stream #1 (step S31). When the write command to be issued to the SSD 3 is a write command corresponding to the write data to be associated with stream #1 (YES in step S31), the processor places the write command in submission queue SQ #1 corresponding to stream #1 (step S32), and further stores the write data associated with the write command in the write buffer 51 in the host memory (step S33).

When the write command to be issued to the SSD 3 is not a write command corresponding to the write data to be associated with stream #1 (NO in step S31), the processor determines whether or not the write command to be issued to the SSD 3 is a write command corresponding to the write data to be associated with stream #2 (step S34).

When the write command to be issued to the SSD 3 is a write command corresponding to the write data to be associated with stream #2 (YES in step S34), the processor places the write command in submission queue SQ #2 corresponding to stream #2 (step S35), and further stores the write data associated with the write command in the write buffer 51 in the host memory (step S36).

When the write command to be issued to the SSD 3 is not a write command corresponding to the write data to be associated with stream #2 (NO in step S34), the processor determines whether or not the write command to be issued to the SSD 3 is a write command corresponding to the write data to be associated with stream #n (step S37).

When the write command to be issued to the SSD 3 is a write command corresponding to the write data to be associated with stream #n (YES in step S37), the processor places the write command in submission queue SQ #n corresponding to stream #n (step S38), and further stores the write data associated with the write command in the write buffer 51 in the host memory (step S39).

The processor places each read command to be issued to the SSD 3 in one or more submission queues different from submission queues SQ #1 to SQ #n such that the read commands are not stored in any of submission queues SQ #1 to SQ #n.

As explained above, according to the present embodiment, a plurality of dedicated submission queues corresponding to a plurality of streams, respectively, are allocated in the memory of the host 2. Until write commands for the minimum write size are accumulated in a submission queue, a write command is not fetched from any submission queue. When write commands for the minimum write size are accumulated in a submission queue, these write commands are fetched, and write data is transferred, and a flash write operation is performed. Thus, there is no need to store a large number of write commands in wait for write in the SSD 3, thereby reducing the memory resources to be prepared in the SSD 3. Furthermore, as write data for the minimum write size are transferred from the write buffer 51 in the host memory to the internal buffer 16, it is possible to immediately start to write the write data transferred to the internal buffer 16 and having the minimum write size into a write destination block. Thus, the internal buffer 16 can be shared by a plurality of streams. Even when the number of streams to be supported by the SSD 3 is increased, a stream write operation can be effectively performed by merely preparing only the internal buffer 16 having the minimum write size.

It is possible to reduce the size of the memory resources to be provided in the SSD 3 in comparison with a configuration in which, every time one or more write commands are placed in a submission queue by the host 2, the write commands are fetched, and write data corresponding to the write commands is transferred.

In the present embodiment, a NAND flash memory is exemplarily shown as a nonvolatile memory. However, the function of the present embodiment is also applicable to other various nonvolatile memories such as a magnetoresistive random access memory (MRAM), a phase-change random access memory (PRAM), a resistive random access memory (ReRAM) and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the host including a submission queue and a write buffer, the memory system comprising:
    a nonvolatile memory, a minimum data size of a data write operation to the nonvolatile memory being a first size; and
    a controller electrically connected to the nonvolatile memory and configured to:
    manage a first pointer for notifying the host of an entry of the submission queue from which the controller is to fetch a next command;
    in response to the host storing a first write command in a first entry of the submission queue, the first write command specifying a size of first write data and a first location of the write buffer where the first write data is stored, check the size of the first write data specified in the first write command, without changing a value of the first pointer; and
    in response to determining that the size of the first write data is smaller than the first size, wait for the host to store a second write command in a second entry of the submission queue, without changing the value of the first pointer.

2. The memory system of claim 1, wherein the controller is further configured to:
    in response to the host storing the second write command in the second entry of the submission queue, the second write command specifying a size of second write data and a second location of the write buffer where the second write data is stored, check the size of the second write data specified in the second write command, without changing the value of the first pointer; and
    in response to determining that a total of the size of the first write data and the size of the second write data is still smaller than the first size, wait for the host to store a third write command in a third entry of the submission queue, without changing the value of the first pointer.

3. The memory system of claim 1, wherein
the controller is further configured to:
in response to the host storing the second write command in the second entry of the submission queue, the second write command specifying a size of second write data and a second location of the write buffer where the second write data is stored, check the size of the second write data specified in the second write command, without changing the value of the first pointer; and
in response to determining that a total of the size of the first write data and the size of the second write data is larger than or equal to the first size, fetch the first write command and the second write command from the first entry and the second entry of the submission queue, respectively, and update the value of the first pointer.

4. The memory system of claim 3, wherein
the controller is further configured to:
obtain at least part of the first write data and at least part of the second write data from the first location and the second location of the write buffer, respectively;
generate third write data by combining the at least part of the first write data with the at least part of the second write data, a size of the third write data being the first size; and
write the generated third write data to the nonvolatile memory.

5. The memory system of claim 1, wherein
the nonvolatile memory includes a plurality of blocks, each of the plurality of blocks being a unit of a data erase operation,
the first write command is one of a plurality of write commands each specifying an identifier for writing data associated with the same identifier to the same block of the nonvolatile memory, and
the controller is configured to wait for the host to store the second write command that specifies the same identifier as specified in the first write command.

6. The memory system of claim 5, wherein
the identifier specified in each of the plurality of write commands is a stream identifier, and
the controller is configured to wait for the host to store the second write command that specifies the same stream identifier as specified in the first write command.

7. The memory system of claim 5, wherein
the submission queue is one of a plurality of command queues each corresponding to the identifier specified in each of the plurality of write commands, and
the controller is configured to manage the first pointer for each of the plurality of command queues.

8. The memory system of claim 1, wherein
the controller includes a doorbell register for storing a value of a second pointer that indicates an entry of the submission queue to which the host is to store a next command, and
the controller is configured to, in response to the host updating the value of the second pointer stored in the doorbell register, determine that the host stores the first write command in the first entry of the submission queue.

9. The memory system of claim 1, wherein
the controller is further configured to:
manage a third pointer for internally managing an entry of the submission queue from which a last command has been fetched.

10. The memory system of claim 1, wherein
the nonvolatile memory includes a plurality of pages and the first size is an integer multiple of a size of each of the plurality of pages.

11. A method of controlling a nonvolatile memory, a minimum data size of a data write operation to the nonvolatile memory being a first size, the method comprising:
managing a first pointer for notifying a host of an entry of a submission queue from which a next command is to be fetched, the host including the submission queue and a write buffer;
determining that the host stores a first write command in a first entry of the submission queue;
in response to determining that the host stores the first write command in the first entry of the submission queue, the first write command specifying a size of first write data and a first location of the write buffer where the first write data is stored, checking the size of the first write data specified in the first write command, without changing a value of the first pointer;
determining that the size of the first write data is smaller than the first size; and
in response to determining that the size of the first write data is smaller than the first size, waiting for the host to store a second write command in a second entry of the submission queue, without changing the value of the first pointer.

12. The method of claim 11, further comprising:
determining that the host stores the second write command in the second entry of the submission queue;
in response to determining that the host stores the second write command in the second entry of the submission queue, the second write command specifying a size of second write data and a second location of the write buffer where the second write data is stored, checking the size of the second write data specified in the second write command, without changing the value of the first pointer;
determining that a total of the size of the first write data and the size of the second write data is still smaller than the first size; and
in response to determining that the total is still smaller than the first size, waiting for the host to store a third write command in a third entry of the submission queue, without changing the value of the first pointer.

13. The method of claim 11, further comprising:
determining that the host stores the second write command in the second entry of the submission queue;
in response to determining that the host stores the second write command in the second entry of the submission queue, the second write command specifying a size of second write data and a second location of the write buffer where the second write data is stored, checking the size of the second write data specified in the second write command, without changing the value of the first pointer;
determining that a total of the size of the first write data and the size of the second write data is larger than or equal to the first size; and
in response to determining that the total is larger than or equal to the first size, fetching the first write command and the second write command from the first entry and the second entry of the submission queue, respectively, and updating the value of the first pointer.

14. The method of claim 13, further comprising:
obtaining at least part of the first write data and at least part of the second write data from the first location and the second location of the write buffer, respectively;

generating third write data by combining the at least part of the first write data with the at least part of the second write data, a size of the third write data being the first size; and writing the generated third write data to the nonvolatile memory.

15. The method of claim 11, wherein
the nonvolatile memory includes a plurality of blocks, each of the plurality of blocks being a unit of a data erase operation,
the first write command is one of a plurality of write commands each specifying an identifier for writing data associated with the same identifier to the same block of the nonvolatile memory, and
the storing of the second write command that specifies the same identifier as specified in the first write command is waited.

16. The method of claim 15, wherein
the identifier specified in each of the plurality of write commands is a stream identifier, and
the storing of the second write command that specifies the same stream identifier as specified in the first write command is waited.

17. The method of claim 15, wherein
the submission queue is one of a plurality of command queues each corresponding to the identifier specified in each of the plurality of write commands, and
the first pointer is managed for each of the plurality of command queues.

18. The method of claim 11, further comprising:
managing a doorbell register for storing a value of a second pointer that indicates an entry of the submission queue to which the host is to store a next command, wherein
the storing of the first write command by the host in the first entry of the submission queue is determined in response to the host updating the value of the second pointer stored in the doorbell register.

19. The method of claim 11, further comprising:
managing a third pointer for managing an entry of the submission queue from which a last command has been fetched.

20. The method of claim 11, wherein
the nonvolatile memory includes a plurality of pages and the first size is an integer multiple of a size of each of the plurality of pages.

* * * * *